(12) United States Patent
Bhardwaj et al.

(10) Patent No.: US 9,747,287 B1
(45) Date of Patent: Aug. 29, 2017

(54) METHOD AND SYSTEM FOR MANAGING METADATA FOR A VIRTUALIZATION ENVIRONMENT

(75) Inventors: Rishi Bhardwaj, San Jose, CA (US); Venkata Ranga Radhanikanth Guturi, San Jose, CA (US); Mohit Aron, Los Altos, CA (US)

(73) Assignee: Nutanix, Inc., San Jose, CA (US)

( * ) Notice: Subject to any disclaimer, the term of this patent is extended or adjusted under 35 U.S.C. 154(b) by 241 days.

(21) Appl. No.: 13/564,511

(22) Filed: Aug. 1, 2012

Related U.S. Application Data

(63) Continuation-in-part of application No. 13/207,357, filed on Aug. 10, 2011, now Pat. No. 8,850,130.

(51) Int. Cl.
*G06F 17/00* (2006.01)
*G06F 17/30* (2006.01)

(52) U.S. Cl.
CPC .............. *G06F 17/30008* (2013.01)

(58) Field of Classification Search
None
See application file for complete search history.

(56) References Cited

U.S. PATENT DOCUMENTS

| | | | |
|---|---|---|---|
| 4,980,822 A * | 12/1990 | Brantley, Jr. | G06F 12/0692 711/202 |
| 6,834,386 B1 | 12/2004 | Douceur et al. | |
| 7,035,881 B2 | 4/2006 | Tummala et al. | |
| 7,360,034 B1 | 4/2008 | Muhlestein et al. | |
| 7,970,851 B2 | 6/2011 | Ponnappan et al. | |
| 8,089,795 B2 | 1/2012 | Rajan | |
| 8,099,572 B1 | 1/2012 | Arora et al. | |
| 8,145,842 B2 | 3/2012 | Shiga | |
| 8,194,674 B1 | 6/2012 | Pagel et al. | |
| 8,407,265 B1 | 3/2013 | Scheer et al. | |
| 8,413,146 B1 | 4/2013 | McCorkendale et al. | |
| 8,438,346 B2 | 5/2013 | Gold | |
| 8,539,484 B1 | 9/2013 | Offer | |
| 8,566,821 B2 | 10/2013 | Robinson et al. | |
| 8,683,153 B1 | 3/2014 | Long et al. | |
| 8,910,156 B1 | 12/2014 | Kenchammana-Hosekote et al. | |
| 8,949,829 B1 | 2/2015 | Xing et al. | |
| 2002/0002448 A1 * | 1/2002 | Kampe | 703/22 |
| 2002/0091574 A1 | 7/2002 | Lefebvre et al. | |
| 2002/0124137 A1 | 9/2002 | Ulrich et al. | |
| 2002/0161889 A1 * | 10/2002 | Gamache et al. | 709/226 |
| 2002/0184239 A1 * | 12/2002 | Mosher et al. | 707/200 |
| 2003/0046369 A1 | 3/2003 | Sim et al. | |
| 2003/0154236 A1 | 8/2003 | Dar et al. | |

(Continued)

FOREIGN PATENT DOCUMENTS

WO    WO 2010117294    10/2010

OTHER PUBLICATIONS

Non-final Office Action dated Apr. 24, 2014, for U.S. Appl. No. 13/744,655.

(Continued)

*Primary Examiner* — David X Yi
*Assistant Examiner* — Craig Goldschmidt
(74) *Attorney, Agent, or Firm* — Vista IP Law Group, LLP

(57) ABSTRACT

Disclosed is an improved approach for managing updates to metadata for a virtualization environment. According to some embodiments, a compare and swap approach is taken to manage updates and to handle possible inconsistencies.

49 Claims, 25 Drawing Sheets

(56) References Cited

U.S. PATENT DOCUMENTS

| | | | |
|---|---|---|---|
| 2003/0202486 A1 | 10/2003 | Anton et al. | |
| 2004/0107227 A1 | 6/2004 | Michael | |
| 2004/0139128 A1 | 7/2004 | Becker et al. | |
| 2004/0148380 A1 | 7/2004 | Meyer | |
| 2004/0221089 A1 | 11/2004 | Sato et al. | |
| 2005/0065985 A1 | 3/2005 | Tummala et al. | |
| 2005/0102672 A1 | 5/2005 | Brothers | |
| 2006/0005189 A1 | 1/2006 | Vega et al. | |
| 2006/0106999 A1 | 5/2006 | Baldwin | |
| 2006/0112093 A1* | 5/2006 | Lightstone et al. | 707/5 |
| 2006/0123062 A1 | 6/2006 | Bobbitt et al. | |
| 2006/0126918 A1* | 6/2006 | Oohashi et al. | 382/153 |
| 2006/0155930 A1 | 7/2006 | Birrell | |
| 2007/0050767 A1 | 3/2007 | Grobman et al. | |
| 2007/0156955 A1 | 7/2007 | Royer, Jr. et al. | |
| 2007/0239942 A1* | 10/2007 | Rajwar et al. | 711/147 |
| 2007/0244938 A1 | 10/2007 | Michael et al. | |
| 2008/0183973 A1 | 7/2008 | Aguilera et al. | |
| 2008/0189468 A1 | 8/2008 | Schmidt | |
| 2008/0189700 A1 | 8/2008 | Schmidt et al. | |
| 2008/0196043 A1 | 8/2008 | Feinleib et al. | |
| 2008/0201709 A1 | 8/2008 | Hodges | |
| 2008/0222234 A1 | 9/2008 | Marchand | |
| 2008/0244028 A1 | 10/2008 | Le et al. | |
| 2008/0263407 A1 | 10/2008 | Yamamoto | |
| 2008/0270564 A1 | 10/2008 | Rangegowda et al. | |
| 2008/0282047 A1 | 11/2008 | Arakawa et al. | |
| 2009/0172165 A1 | 7/2009 | Rokuhara et al. | |
| 2009/0172660 A1 | 7/2009 | Klotz et al. | |
| 2009/0183159 A1 | 7/2009 | Michael et al. | |
| 2009/0222542 A1 | 9/2009 | Miyajima | |
| 2009/0259759 A1 | 10/2009 | Miyajima | |
| 2009/0300660 A1 | 12/2009 | Solomon et al. | |
| 2009/0313391 A1 | 12/2009 | Watanabe | |
| 2010/0037243 A1 | 2/2010 | Mo et al. | |
| 2010/0070470 A1 | 3/2010 | Milencovici et al. | |
| 2010/0070725 A1 | 3/2010 | Prahlad et al. | |
| 2010/0106907 A1* | 4/2010 | Noguchi | G06F 11/2069 711/114 |
| 2010/0115174 A1 | 5/2010 | Akyol et al. | |
| 2010/0125842 A1 | 5/2010 | Friedman et al. | |
| 2010/0138827 A1 | 6/2010 | Frank et al. | |
| 2010/0153514 A1 | 6/2010 | Dabagh | |
| 2010/0161908 A1 | 6/2010 | Nation et al. | |
| 2010/0162039 A1 | 6/2010 | Goroff et al. | |
| 2010/0174820 A1 | 7/2010 | Banga et al. | |
| 2010/0199276 A1 | 8/2010 | Umbehocker | |
| 2010/0228903 A1 | 9/2010 | Chandrasekaran | |
| 2010/0235831 A1 | 9/2010 | Dittmer | |
| 2010/0251238 A1 | 9/2010 | Schuba et al. | |
| 2010/0262586 A1 | 10/2010 | Rosikiewicz et al. | |
| 2010/0275198 A1 | 10/2010 | Jess et al. | |
| 2010/0281166 A1 | 11/2010 | Buyya et al. | |
| 2010/0299368 A1 | 11/2010 | Hutchins et al. | |
| 2010/0332889 A1 | 12/2010 | Shneorson et al. | |
| 2011/0010515 A1 | 1/2011 | Ranade | |
| 2011/0061050 A1 | 3/2011 | Sahita et al. | |
| 2011/0071983 A1 | 3/2011 | Murase | |
| 2011/0099551 A1* | 4/2011 | Fahrig et al. | 718/102 |
| 2011/0145418 A1 | 6/2011 | Pratt | |
| 2011/0145534 A1 | 6/2011 | Factor et al. | |
| 2011/0145916 A1 | 6/2011 | Mckenzie et al. | |
| 2011/0154318 A1 | 6/2011 | Oshins et al. | |
| 2011/0179413 A1 | 7/2011 | Subramanian | |
| 2011/0184993 A1 | 7/2011 | Chawla et al. | |
| 2011/0185292 A1 | 7/2011 | Chawala et al. | |
| 2011/0202920 A1 | 8/2011 | Takase | |
| 2011/0208909 A1 | 8/2011 | Kawaguchi | |
| 2011/0239213 A1 | 9/2011 | Aswani et al. | |
| 2011/0245724 A1* | 10/2011 | Flatland et al. | 600/567 |
| 2011/0258404 A1 | 10/2011 | Arakawa et al. | |
| 2011/0314469 A1 | 12/2011 | Qian et al. | |
| 2011/0320556 A1 | 12/2011 | Reuther | |
| 2012/0002535 A1 | 1/2012 | Droux et al. | |
| 2012/0005307 A1 | 1/2012 | Das et al. | |
| 2012/0011505 A1 | 1/2012 | Fujisaki et al. | |
| 2012/0030676 A1 | 2/2012 | Smith et al. | |
| 2012/0036134 A1* | 2/2012 | Malakhov | 707/747 |
| 2012/0054746 A1 | 3/2012 | Vaghani | |
| 2012/0079229 A1 | 3/2012 | Jensen et al. | |
| 2012/0084445 A1 | 4/2012 | Brock et al. | |
| 2012/0096211 A1 | 4/2012 | Davis et al. | |
| 2012/0096461 A1 | 4/2012 | Goswami et al. | |
| 2012/0102006 A1* | 4/2012 | Larson et al. | 707/703 |
| 2012/0102491 A1 | 4/2012 | Maharana | |
| 2012/0117320 A1 | 5/2012 | Pinchover | |
| 2012/0117555 A1 | 5/2012 | Banerjee | |
| 2012/0124186 A1 | 5/2012 | Emerson | |
| 2012/0137098 A1 | 5/2012 | Wang et al. | |
| 2012/0144229 A1 | 6/2012 | Nadolski | |
| 2012/0158674 A1 | 6/2012 | Lillibridge | |
| 2012/0167079 A1 | 6/2012 | Banerjee et al. | |
| 2012/0167080 A1 | 6/2012 | Vilayannur | |
| 2012/0167082 A1 | 6/2012 | Kumar et al. | |
| 2012/0167085 A1 | 6/2012 | Subramaniyan et al. | |
| 2012/0179874 A1 | 7/2012 | Chang et al. | |
| 2012/0215970 A1* | 8/2012 | Shats | G06F 12/0866 711/103 |
| 2012/0221529 A1 | 8/2012 | Rosikiewicz et al. | |
| 2012/0233668 A1 | 9/2012 | Leafe | |
| 2012/0254862 A1 | 10/2012 | Dong | |
| 2012/0265959 A1 | 10/2012 | Le et al. | |
| 2012/0266165 A1 | 10/2012 | Cen et al. | |
| 2012/0272240 A1 | 10/2012 | Starks et al. | |
| 2012/0284712 A1 | 11/2012 | Nimmagadda et al. | |
| 2012/0291021 A1 | 11/2012 | Banerjee | |
| 2013/0007219 A1 | 1/2013 | Sorenson et al. | |
| 2013/0013865 A1 | 1/2013 | Venkatesh | |
| 2013/0014103 A1 | 1/2013 | Reuther et al. | |
| 2013/0055259 A1 | 2/2013 | Dong | |
| 2013/0061014 A1 | 3/2013 | Prahlad et al. | |
| 2013/0139153 A1 | 5/2013 | Shah | |
| 2014/0006731 A1 | 1/2014 | Uluski et al. | |

OTHER PUBLICATIONS

Notice of Allowance and Fees Due dated May 23, 2014 for U.S. Appl. No. 13/207,357.
Non-Final Office Action dated May 16, 2014 for U.S. Appl. No. 13/744,649.
Notice of Allowance dated Jun. 11, 2014 for U.S. Appl. No. 13/571,188.
Non-final Office Action dated Jan. 27, 2013 for U.S. Appl. No. 13/571,188.
Notice of Allowance and Fees Due dated Aug. 23, 2013 for U.S. Appl. No. 13/207,345.
Non-final Office Action dated Dec. 26, 2012 for U.S. Appl. No. 13/207,365.
Non-final Office Action dated Jan. 24, 2013 for U.S. Appl. No. 13/207,371.
Thekkath et al., "Frangipani: A Scalable Distributed File System", SOSP, 1997, 24 pages.
Mendel Rosenblum, "The Design and Implementation of a Log-structured File System", SOSP, 1991, 101 pages.
Birrell et al., "A Simple and Efficient Implementation for Small Databases", Aug. 11, 1987, 17 pages.
Terry et al., "Managing Update Conflicts in Bayou, a Weakly Connected Replicated Storage System", Association for Computing Machinery, 1995, 12 pages.
Mike Burrows, "The Chubby lock service for loosely-coupled distributed systems", OSDI 2006 Paper, Google Inc., Sep. 6, 2006, 23 pages.
Lee et al., "Petal: Distributed Virtual Disks" The Proceedings of the 7th International Conference on Architectural Support for Programming Languages and Operating Systems, 1996, 9 pages.
Dean et al., "MapReduce: Simplified Data Processing on Large Clusters", OSDI 2004, 6th Symposium on Operating Systems Design and Implementation, Google Inc, Oct. 3, 2004, 25 pages.
Chang et al., "Bigtable: A Distributed Storage System for Structured Data" OSDI 2006 Paper, 7th USENIX Symposium on Operating Systems Design and Implementation, 2006, 20 pages.

(56) References Cited

OTHER PUBLICATIONS

Ghemawat et al., "The Google File System", SOSP 2003, ACM, Bolton Landing, NY, 2003, 15 pages.
Zhu et al., "Avoiding the Disk Bottleneck in the Data Domain Deduplication File System", Data Domain, Inc., 2008, 15 pages.
DeCandia et al., "Dynamo: Amazon's Highly Available Key-value Store", Proceedings of the 21st ACM Symposium on Operating Systems Principles, Oct. 2007, 16 pages.
Project Voldemort, A distributed database, Jan. 9, 2013 url: http://www.project-voldemort.com/voldemort/.
Bernstein et al., "Concurrency Control and Recovery in Database Systems", Addison-Wesley 1987, 35 pages.
Weikum et al., "Transactional Information Systems: Theory, Algorithms, and the Practice of Concurrency Control and Recovery", 2002, 91 pages.
Timothy L. Harris, "A Pragmatic Implementation of Non-Blocking Linked-Lists", 2001, 15 pages.
Lakshman et al., "Cassandra—A Decentralized Structured Storage System", LADIS, 2009, 6 pages.
"Open iSCSI", Project: Open-iSCSI—RFC3720 architecture and implementation, 2005 url: http://www.open-iscsi.org.
"Chunkfs", Aug. 22, 2009 url: http://valerieaurora.org/chunkfs/.
"Hypertable", Hypertable Inc., Oct. 28, 2012 url: http://hypertable.org/.
MacCormick et al., "Boxwood: Abstractions as the Foundation for Storage Infrastructure" OSDI 2004, Microsoft Research Silicon Valley, 31 pages.
Robert Hagmann, "Reimplementing the Cedar File System Using Logging and Group Commit", ACM, 1987, 8 pages.
Sherman et al., "ACMS: The Akamai Configuration Management System" NSDI, 2005, 22 pages.
Petersen et al., "Flexible Update Propagation for Weakly Consistent Replication", SOSP, 1997, 19 pages.
Banga et al., "Resource containers: A new facility for resource management in server systems" Proceedings of the 3rd USENIX Symposium on ODSI, 1999, 15 pages.
F. Mattern, "Virtual Time and Global States of Distributed Systems" Proceedings of the International Workshop on Parallel and Distributed Algorithms, 1989, 15 pages.
Maged M. Michael, "High Performance Dynamic Lock-Free Hash Tables and List-Based Sets" SPAA 2002, Aug. 2002, 10 pages.
Welsh et al., "SEDA: An Architecuture for Well-Conditioned, Scalable Internet Services" Proceedings of the Eighteenth Symposium on Operating Systems Principles, Oct. 2001, 15 pages.
Notice of Allowance and Fees Due dated Apr. 8, 2013 for U.S. Appl. No. 13/207,365.
Non-final Office Action dated Apr. 11, 2013 for U.S. Appl. No. 13/207,345.
Final Office Action dated Jun. 27, 2013 for U.S. Appl. No. 13/207,371.
Non-final Office Action dated Aug. 26, 2014 for U.S. Appl. No. 13/744,668.
Corrected Notice of Allowance dated Sep. 5, 2014 for U.S. Appl. No. 13/207,357.
Non-final Office Action dated Sep. 26, 2014 for U.S. Appl. No. 13/947,668.
Non-final Office Action dated Oct. 16, 2014 for U.S. Appl. No. 13/744,683.
Final Office Action dated Nov. 3, 2014, for U.S. Appl. No. 13/744,649.
Final Office Action dated Nov. 3, 2014, for U.S. Appl. No. 13/744,655.
Non-final Office Action dated Nov. 6, 2014, for U.S. Appl. No. 13/744,693.
Notice of Allowance and Fees Due dated Nov. 21 2014, for U.S. Appl. No. 13/744,703.
Notice of Allowance and fees Due dated Dec. 1, 2014 for U.S. Appl. No. 13/207,371.
Notice of Allowance and Fee(s) Due dated Feb. 6, 2015 for U.S. Appl. No. 13/744,683.
Final Office Action dated Feb. 12, 2015 for U.S. Appl. No. 13/744,668.
Non-final Office Action dated Feb. 23, 2015 for U.S. Appl. No. 13/744,649.
Non-final Office Action dated Feb. 24, 2015 for U.S. Appl. No. 13/830,116.
Non-final Office Action dated Mar. 5, 2015 for U.S. Appl. No. 13/744,655.
Non-final Office Action dated Mar. 11, 2015 for U.S. Appl. No. 13/551,291.
Non-final Office Action dated Mar. 12, 2015 for U.S. Appl. No. 14/514,326.
Final Office Action dated Apr. 9, 2015 for U.S. Appl. No. 13/744,693.
Notice of Allowance and Fee(s) Due dated Apr. 22, 2015 for U.S. Appl. No. 14/500,730.
Non-final Office Action dated Apr. 27, 2015 for U.S. Appl. No. 14/500,752.
Final Office Action dated May 5, 2015 for U.S. Appl. No. 13/947,668.
Non-final Office Action dated Jun. 1, 2015 for U.S. Appl. No. 13/744,668.
Final Office Action dated Jun. 5, 2015 for U.S. Appl. No. 13/744,649.
Final Office Action dated Aug. 14, 2015 for related U.S. Appl. No. 13/830,116.
Non-final Office Action dated Aug. 25, 2015 for related U.S. Appl. No. 13/744,693.
Final Office Action dated Aug. 26, 2015 for related U.S. Appl. No. 13/744,655.
Notice of Allowance and Fee(s) due dated Sep. 15, 2015 for related U.S. Appl. No. 14/500,730.
Non-final Office Action dated Sep. 17, 2015, for related U.S. Appl. No. 13/744,649.
Notice of Allowance and fees due dated Sep. 30, 2015, for related U.S. Appl. No. 14/514,326.
Final Office Action dated Oct. 1, 2015 for related U.S. Appl. No. 13/551,291.
Notice of Allowance and Fees due dated Oct. 2, 2015 for related U.S. Appl. No. 13/744,668.
Final Office Action dated Mar. 28, 2016 for related U.S. Appl. No. 13/744,693.
Notice of Allowance and Fee(s) due dated Jun. 14, 2016 for related U.S. Appl. No. 13/744,655.
Final Office Action dated Jul. 29, 2016 for related U.S. Appl. No. 13/830,116.
Final Office Action dated Aug. 12, 2016 for related U.S. Appl. No. 13/551,291.
Non-final Office Action dated Dec. 31, 2015 for related U.S. Appl. No. 13/830,116.
Nigmandjanovich et al., "Policy-based dynamic resource allocation for virtual machines on Xen-enabled virtualization environment", IEEE, 2010, pp. 353-355.
Bolte et al., "Non-intrusive Virtualization Management using Libvert", EDAA 2010, pp. 574-577.
Final Office Action dated Jan. 6, 2016 for related U.S. Appl. No. 14/500,752.
Corrected Notice of Allowance dated Jan. 11, 2016 for U.S. Appl. No. 14/500,730.
Notice of Allowability dated Jan. 20, 2016 for related U.S. Appl. No. 13/947,668.
Non-final Office Action dated Jan. 25, 2016 for related U.S. Appl. No. 13/744,655.
Leslie Lamport, "Paxos Made Simple", ACM SIGACT News, Nov. 1, 2001.
Non-final Office Action dated Feb. 12, 2016 for related U.S. Appl. No. 13/551,291.
Notice of Allowance and Fee(s) Due due dated Mar. 8, 2016 for U.S. Appl. No. 13/744,649.
Non-final Office Action dated Dec. 13, 2016 for related U.S. Appl. No. 13/551,291.
Notice of Allowance and Fees Due dated Jan. 6, 2017 for related U.S. Appl. No. 13/830,116.

(56) References Cited

OTHER PUBLICATIONS

Notice of Allowance and Fee(s) due dated Sep. 6, 2016 for related U.S. Appl. No. 13/744,693.
Notice of Allowance and Fee(s) due dated Sep. 26, 2016 for related U.S. Appl. No. 13/744,655.
Notice of Allowance and Fees Due dated May 24, 2017 for related U.S. Appl. No. 13/551,291.

* cited by examiner

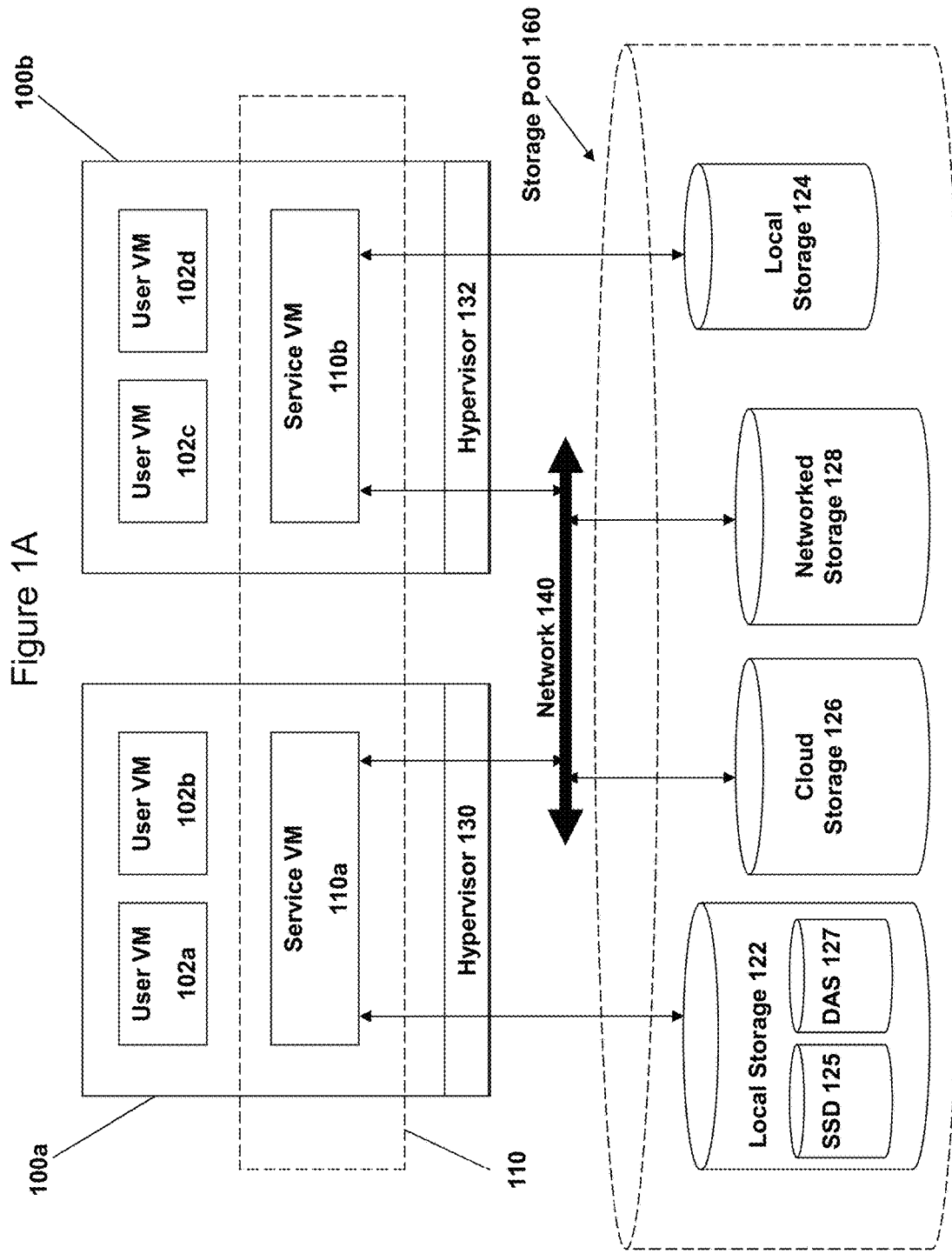

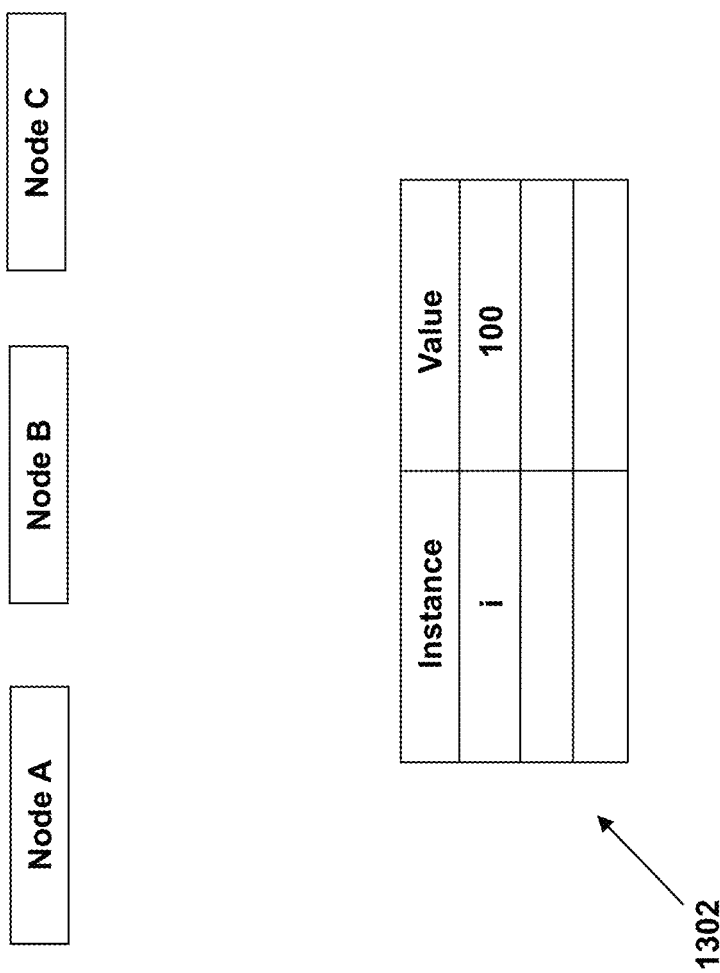

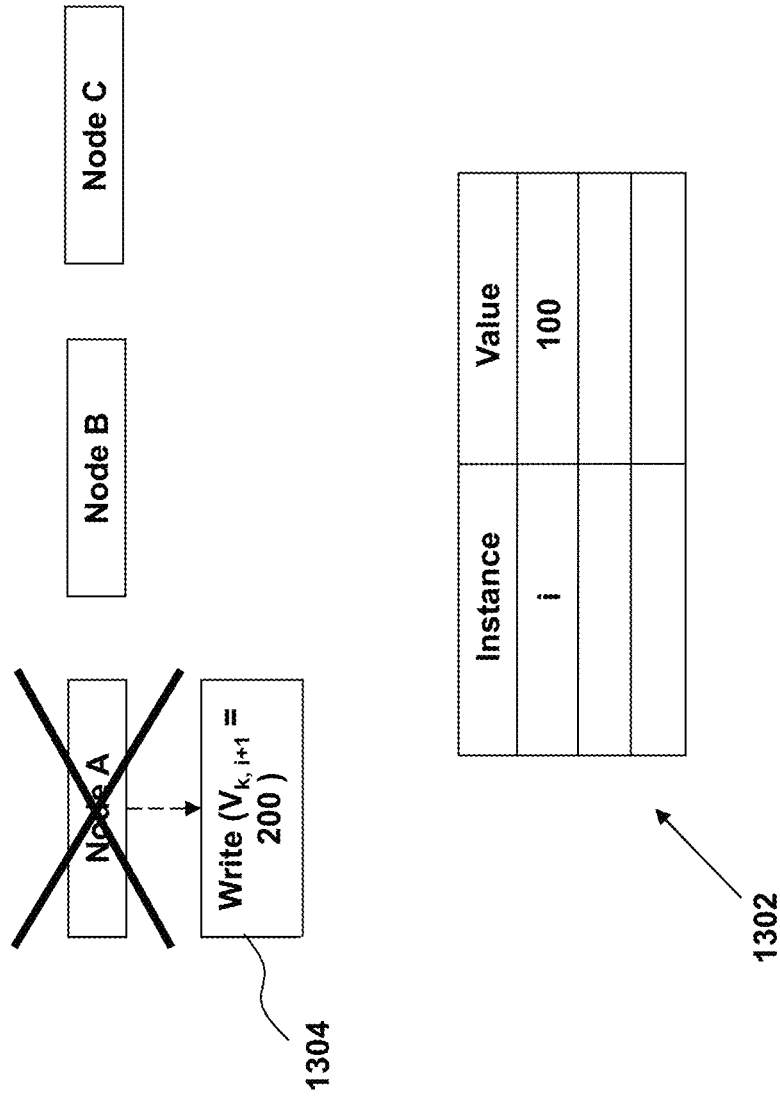

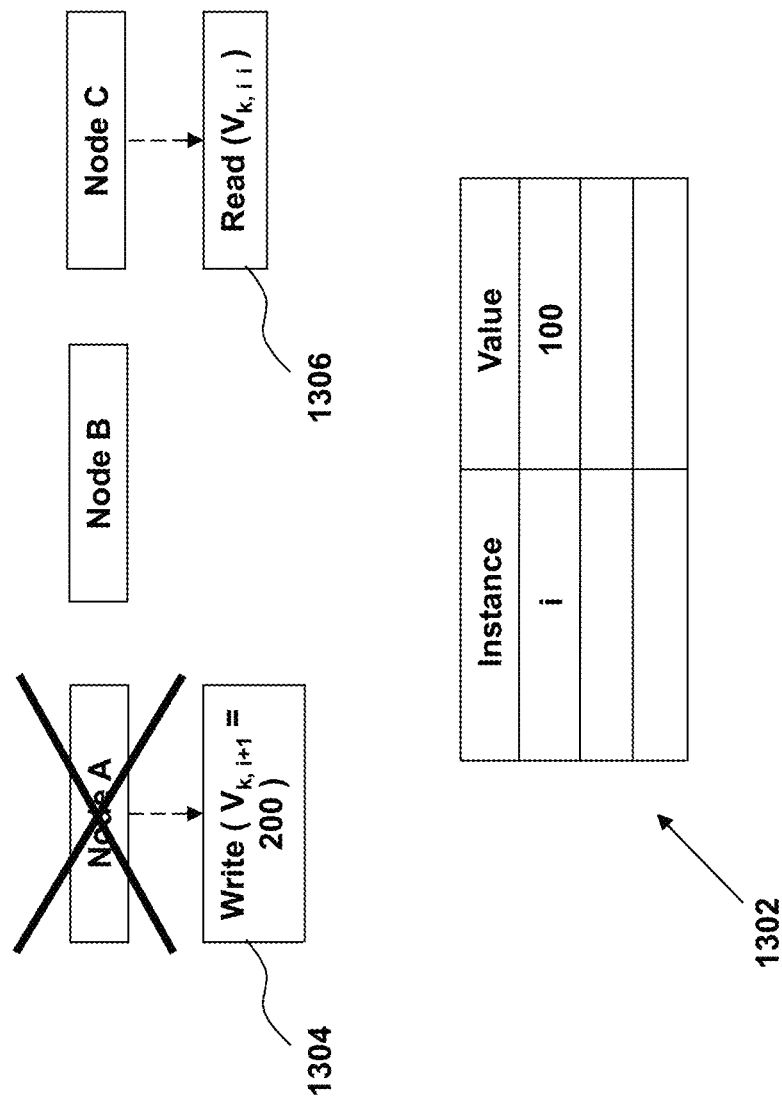

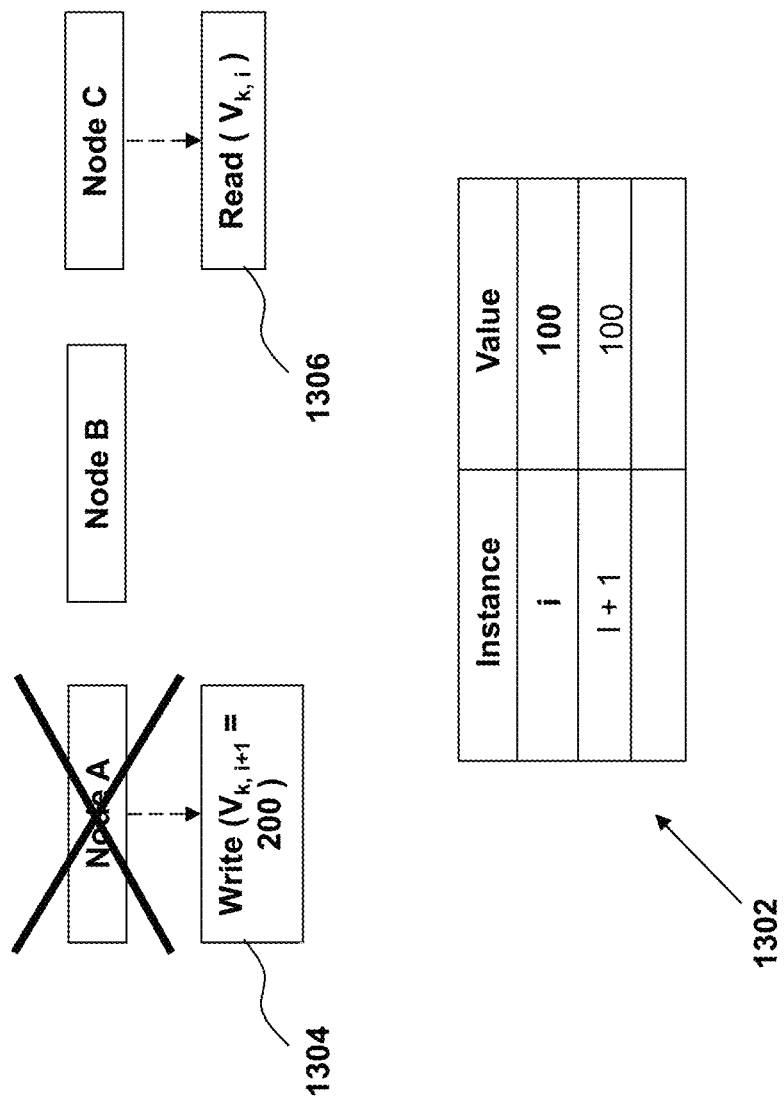

Figure 14

| | Col 1 | Col 2 | Col 3 |
|---|---|---|---|
| Row 1 | 1 | 2 | 3 |
| Row 2 | | | |
| Row 3 | | | |

1409

| | Instance$_{Row}$ | Col 1 | Col 2 | Col 3 |
|---|---|---|---|---|
| | 3 | 1 | 2 | 3 |
| Row 1 | | | | |
| Row 2 | | | | |
| Row 3 | | | | |

1509

METHOD AND SYSTEM FOR MANAGING METADATA FOR A VIRTUALIZATION ENVIRONMENT

CROSS REFERENCE TO RELATED APPLICATIONS

The present application is a continuation-in-part of application Ser. No. 13/207,357, now issued as U.S. Pat. No. 8,850,130, filed Aug. 10, 2011, entitled "METADATA FOR MANAGING I/O AND STORAGE FOR A VIRTUALIZATION ENVIRONMENT", and is also related to application Ser. No. 13/207,345, now issued as U.S. Pat. No. 8,601,473, filed Aug. 10, 2011, entitled "ARCHITECTURE FOR MANAGING I/O AND STORAGE FOR A VIRTUALIZATION ENVIRONMENT", application Ser. No. 13/207,365, now issued as U.S. Pat. No. 8,549,518, filed Aug. 10, 2011, entitled "METHOD AND SYSTEM FOR IMPLEMENTING A MAINTENANCE SERVICE FOR MANAGING I/O AND STORAGE FOR A VIRTUALIZATION ENVIRONMENT", application Ser. No. 13/207,371, now issued as U.S. Pat. No. 9,009,106, filed Aug. 10, 2011, entitled "METHOD AND SYSTEM FOR IMPLEMENTING WRITABLE SNAPSHOTS IN A VIRTUALIZED STORAGE ENVIRONMENT", and application Ser. No. 13/207,375, filed Aug. 10, 2011, entitled "METHOD AND SYSTEM FOR IMPLEMENTING A FAST CONVOLUTION FOR COMPUTING APPLICATIONS", and which are all hereby incorporated by reference in their entirety.

FIELD

This disclosure concerns an architecture for managing I/O and storage devices in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Data Centers are typically architected as diskless computers ("application servers") talking to a set of networked storage appliances ("storage servers") via a Fiber Channel or Ethernet network. A storage server exposes volumes that are mounted by the application servers for their storage needs. If the storage server is a block-based server, it exposes a set of volumes that are also called Logical Unit Numbers (LUNs). If, on the other hand, a storage server is file-based, it exposes a set of volumes that are also called file systems. Either way, a volume is the smallest unit of administration for a storage device, e.g., a storage administrator can set policies to backup, snapshot, RAID-protect, or WAN-replicate a volume, but cannot do the same operations on a region of the LUN, or on a specific file in a file system.

Storage devices comprise one type of physical resource that can be managed and utilized in a virtualization environment. For example, VMVVare is a company that provides products to implement virtualization, in which networked storage devices are managed by the VMVVare virtualization software to provide the underlying storage infrastructure for the VMs in the computing environment. The VMVVare approach implements a file system (VMFS) that exposes emulated storage hardware to the VMs. The VMVVare approach uses VMDK "files" to represent virtual disks that can be accessed by the VMs in the system. Effectively, a single volume can be accessed and shared among multiple VMs.

While this known approach does allow multiple VMs to perform I/O activities upon shared networked storage, there are also numerous drawbacks and inefficiencies with this approach. For example, because the VMWare approach is reliant upon the VMFS file system, administration of the storage units occurs at a too-broad level of granularity. While the virtualization administrator needs to manage VMs, the storage administrator is forced to manage coarse-grained volumes that are shared by multiple VMs. Configurations such as backup and snapshot frequencies, RAID properties, replication policies, performance and reliability guarantees etc. continue to be at a volume level, and that is problematic. Moreover, this conventional approach does not allow for certain storage-related optimizations to occur in the primary storage path.

Therefore, there is a need for an improved approach to implement I/O and storage device management in a virtualization environment.

SUMMARY

Embodiments of the present invention provide an approach for using advanced metadata to implement an architecture for managing I/O operations and storage devices for a virtualization environment. According to some embodiments, a Service VM is employed to control and manage any type of storage device, including directly attached storage in addition to networked and cloud storage. The Service VM implements the Storage Controller logic in the user space, and with the help of other Service VMs in a cluster, virtualizes all storage hardware as one global resource pool that is high in reliability, availability, and performance. The advanced metadata is used to track data within the storage devices. A lock-free approach is implemented in some embodiments to access and modify the metadata.

According to some embodiments, disclosed is an improved approach for managing updates to metadata for a virtualization environment. According to some embodiments, a compare and swap approach is taken to manage updates and to handle possible inconsistencies.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 1A illustrates an example architecture to implement I/O and storage device management in a virtualization environment according to some embodiments of the invention.

FIGS. 13A-G illustrate the process of FIG. 12.

FIG. 14 illustrates a table to track values according to some embodiments of the invention.

DETAILED DESCRIPTION OF THE EMBODIMENTS OF THE INVENTION

Figure 1B:
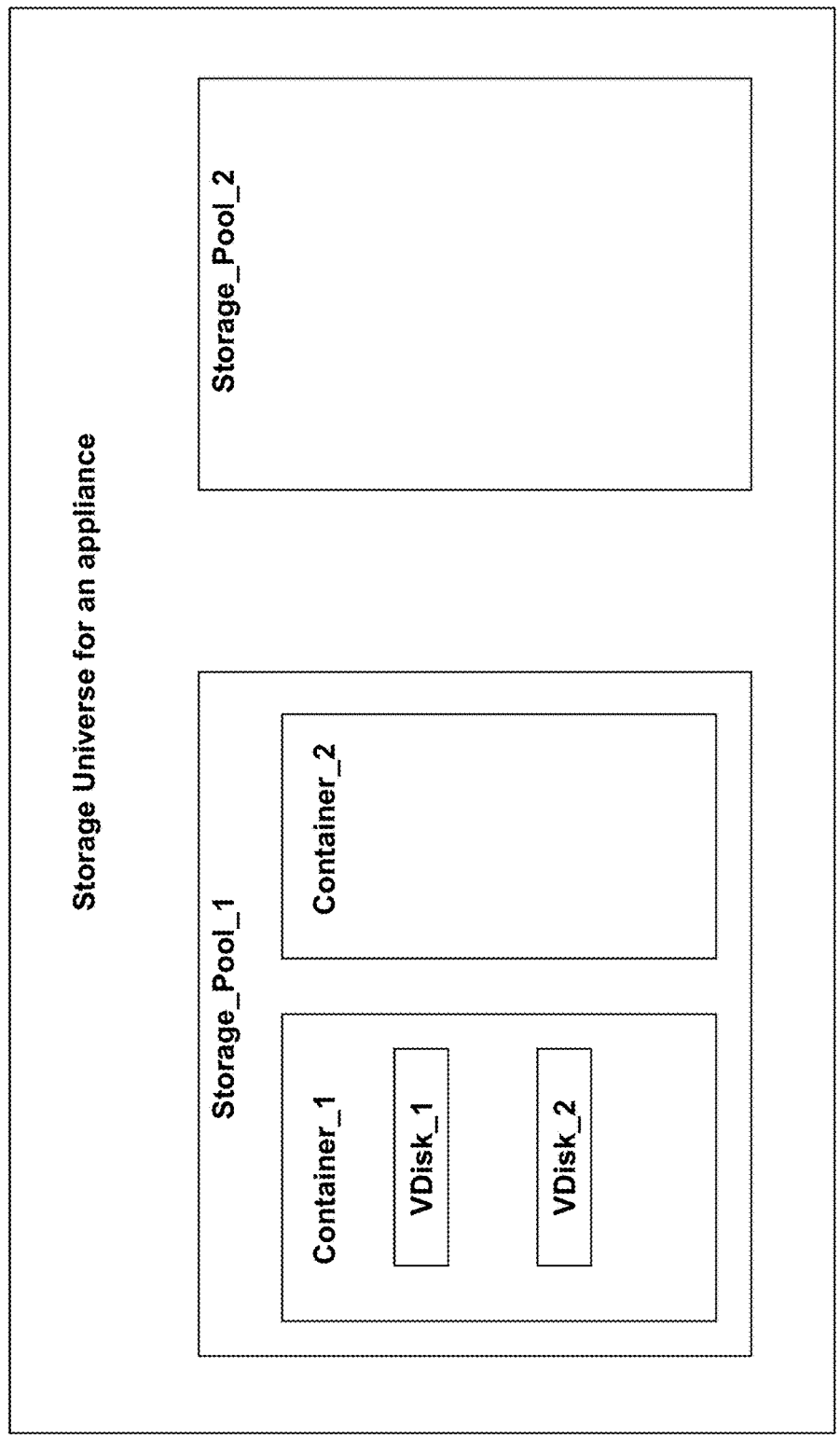
FIG. 1B illustrates a storage hierarchy according to some embodiments of the invention.

Embodiments of the present invention provide an approach for using advanced metadata to implement an architecture for managing I/O operations and storage devices for a virtualization environment. According to some embodiments, a Service VM (also referred to herein as a "controller VM") is employed to control and manage any type of storage device, including directly attached storage in addition to networked and cloud storage. The Service VM implements the Storage Controller logic in the user space, and with the help of other Service VMs in a cluster, virtualizes all storage hardware as one global resource pool that is highly reliable, available, and in performance. The advanced metadata is used to track data within the storage devices. A lock-free approach is implemented in some embodiments to access and modify the metadata.

FIG. 1A illustrates an architecture for implementing storage management in a virtualization environment according to some embodiments of the invention. The architecture of FIG. 1A can be implemented for a distributed platform that contains multiple servers 100a and 100b that manages multiple-tiers of storage. Like the prior art, the multiple tiers of storage includes storage that is accessible through a network 140, such as cloud storage 126 or networked storage 128 (e.g., a SAN or "storage area network"). Unlike the prior art, the present embodiment also permits management of local storage 122/124 that is within or directly attached to the server and/or appliance. Examples of such storage include SSDs 125 ("Solid State Drives") or HDDs ("hard disk drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as the ESX product available from VMWare. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". The Service VMs 110a/110b are not formed as part of specific implementations of hypervisors 130/132. Instead, the Service VMs run as virtual machines in the hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110*a-b* exports one or more block devices or NFS server targets that appear as disks to the client VMs 102*a-d*. These disks are virtual, since they are implemented by the software running inside the Service VMs 110*a-b*. Thus, to the user VMs 102*a-d*, the Service VMs 110*a-b* appear to be exporting a clustered storage appliance that contains some disks. All user data (including the operating system) in the client VMs 102*a-d* resides on these virtual disks.

Significant performance advantages can be gained by allowing the virtualization system to access and utilize local (server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Yet another advantage of the present embodiment of the invention is that storage-related optimizations for access and storage of data can be implemented directly within the primary storage path. For example, in some embodiments of the invention, the Service VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

According to some embodiments, the service VM runs the Linux operating system. The service VM exports virtual disks to the user VMs For easy management of the appliance, the storage is divided up into abstractions that have a hierarchical relationship to each other. FIG. 1B illustrates the storage hierarchy of the storage objects according to some embodiments of the invention, where all storage in the storage appliance collectively forms a Storage Universe. These storage devices may encompass any suitable devices, such as server-local SSDs or HDDs, network-attached SAN or Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make just one storage pool with all the disks in the storage universe in that pool. However, the principal idea behind dividing up the storage universe is to provide mutual exclusion when accessing the disk resources.

This may be one approach that can be taken to implement QoS techniques. For example, one rogue user may result in lots of random JO activity on a hard disk—thus if other users are doing sequential IO, they still might get hurt by the rogue user. Enforcing exclusion through storage pools might be used to provide hard guarantees for premium users. Another reason to use a storage pool might be to reserve some disks for later use.

In some embodiments, the container abstraction specifies a de-duplication domain. That is, all de-duplication is done for data stored within a container. Data in different containers is not de-duplicated even if it is the same. A container is assigned one or more storage pools—this defines the disks where the data for that container will be stored. A container supports several configuration parameters that determine how the data on that container is treated, including for example some or all of the following:

1. Replication factor: Data in a container is replicated based on this replication factor. Replicas are placed on different servers whenever possible.
2. Reed Solomon parameters: While all data is written initially based on the specified replication factor, it may be converted later to use Reed Solomon encoding to further save on storage capacity. The data contraction policy on the vDisks enforces when the data is converted to use Reed Solomon encoding.
3. Encryption type: Data in a container is encrypted based on the specified encryption policy if any. It is noted that there are also other encoding schemes which can be utilized as well.
4. Compression type: Data in a container is compressed based on the given compression type. However, when to compress is a policy that's specified on individual vDisks assigned to a container. That is, compression may be done inline, or it may be done offline.
5. Max capacity: This parameter specifies the max total disk capacity to be used in each tier in the assigned storage pools.
6. Min reserved capacity (specified for each tier): This parameter can also be specified for each tier in the assigned storage pools. It reserves a certain amount of disk space on each tier for this container. This ensures that that disk space would be available for use for this container irrespective of the usage by other containers.
7. Min total reserved capacity: This is the minimum reserved across all tiers. This value should be greater than or equal to the sum of the min reserved capacity per tier values.
8. Max de-duplication extent size: The Rabin fingerprinting algorithm breaks up a contiguous space of data into variable sized extents for the purpose of de-duplication. This parameter determines the max size of such extents.

9. Stripe width: To get high disk bandwidth, it is important to stripe data over several disks. The stripe width dictates the number of extents corresponding to a contiguous vDisk address space that'll be put in a single extent group.

10. Tier ordering: All tiers in the assigned storage pools are ordered relative to each other. Hot data is placed in the tier highest up in the order and migrated to other tiers later based on the ILM ("Information Lifecycle Management" or data waterfalling) policy. A different tier ordering may be specified for random IO as opposed to sequential IO. Thus, one may want to migrate data to the SSD tier only for random IO and not for sequential IO.

11. ILM policy: The ILM policy dictates when data is migrated from one tier to the tier next in the tier ordering. For example, this migration may start when a given tier is more than 90% full or when the data on that tier is more than X days old.

vDisks are the virtual disks that are exported to user VMs by the Service VMs. A vDisk is a software abstraction that manages an address space of S bytes where S is the size of the block device. Each service VM might export multiple vDisks. A user VM might access several vDisks. Typically, all the vDisks exported by a service VM are accessed only by the user VMs running on that server node. A vDisk is assigned a unique container at creation time. The data in the vDisk is thus managed according to the configuration parameters set on the container. Some additional configuration parameters are specified on the vDisk itself, including some or all of the following:

1. De-duplication: This specifies whether de-duplication is to be used for this vDisk. However, when de-duplication is used is determined by the data contraction policy.

2. Data contraction policy: The data contraction policy controls when de-duplication, compression, and Reed-Solomon encoding is applied (if any of them are specified). De-duplication and compression may be applied in-line to a primary storage path or out-of-line. If out-of-line, the data contraction policy specifies the time when deduplication/compression are applied (e.g., X days). Reed-Solomon encoding should be applied offline. The data contraction policy may specify a different time for doing Reed-Solomon than for deduplication/compression. Note that if both deduplication and compression are specified, then data would be de-duplicated and compressed at the same time before writing to disk.

3. Min total reserved capacity: This is the minimum reserved capacity for this vDisk across all the storage tiers. The sum of all minimum total reserved capacity parameters for the vDisks in a container should be less than or equal to the minimum total reserved capacity set on the container.

4. vDisk block size: The vDisk address space is discretized into equal sized blocks. Information about each block is stored, and a the configuration parameter determines the size of this block. It should be less than or equal to the stripe width parameter on the container. A relatively large vDisk block size (e.g., 128 KB) helps reduce the metadata that is maintained.

5. vDisk row blocks: The blocks in a vDisk are conceptually divided into rows. The metadata for each row is kept on one metadata server. This parameter controls how many blocks of this vDisk are in one row.

6. vDisk Capacity: This is the size (in bytes) of the vDisk address space. This effectively controls the size of disk that an external user VM sees.

7. QoS parameters: Each vDisk may specify a priority and a fair share. Competing JO requests from various vDisks shall be scheduled based on this priority and fair share.

As noted above, embodiments of the invention can be used to directly implement de-duplication when implementing I/O in a virtualization environment. De-duplication refers to the process of making sure that a specific data item is not excessively duplicated multiple times within a storage system. Even if there are multiple users or entities that separately perform operations to store the same data item, the de-duplication process will operate to store only a limited number of copies of the data item, but allow those multiple users/entities to jointly access the copies that are actually stored within the storage system.

In some embodiments of the invention, the basic unit of de-duplication is the extent, which is a contiguous portion of storage on a given storage device. Multiple extents can be collected together and stored within an "extent group." In some embodiments, an extent group corresponds to a single file managed by the underlying filesystem. Thus, the embodiment would utilize a filesystem (e.g., a Linux filesystem) to manage files, where the files correspond to the extent groups to store a set of individual extents. It is noted that while the unit of de-duplication is the extent, the units used for the underlying storage for the extents can be at the granularity of a block. This permits the administration and user access of the data to be a finer level of granularity than the "file" or "extent" level, as described in more detail below.

Figure 2:
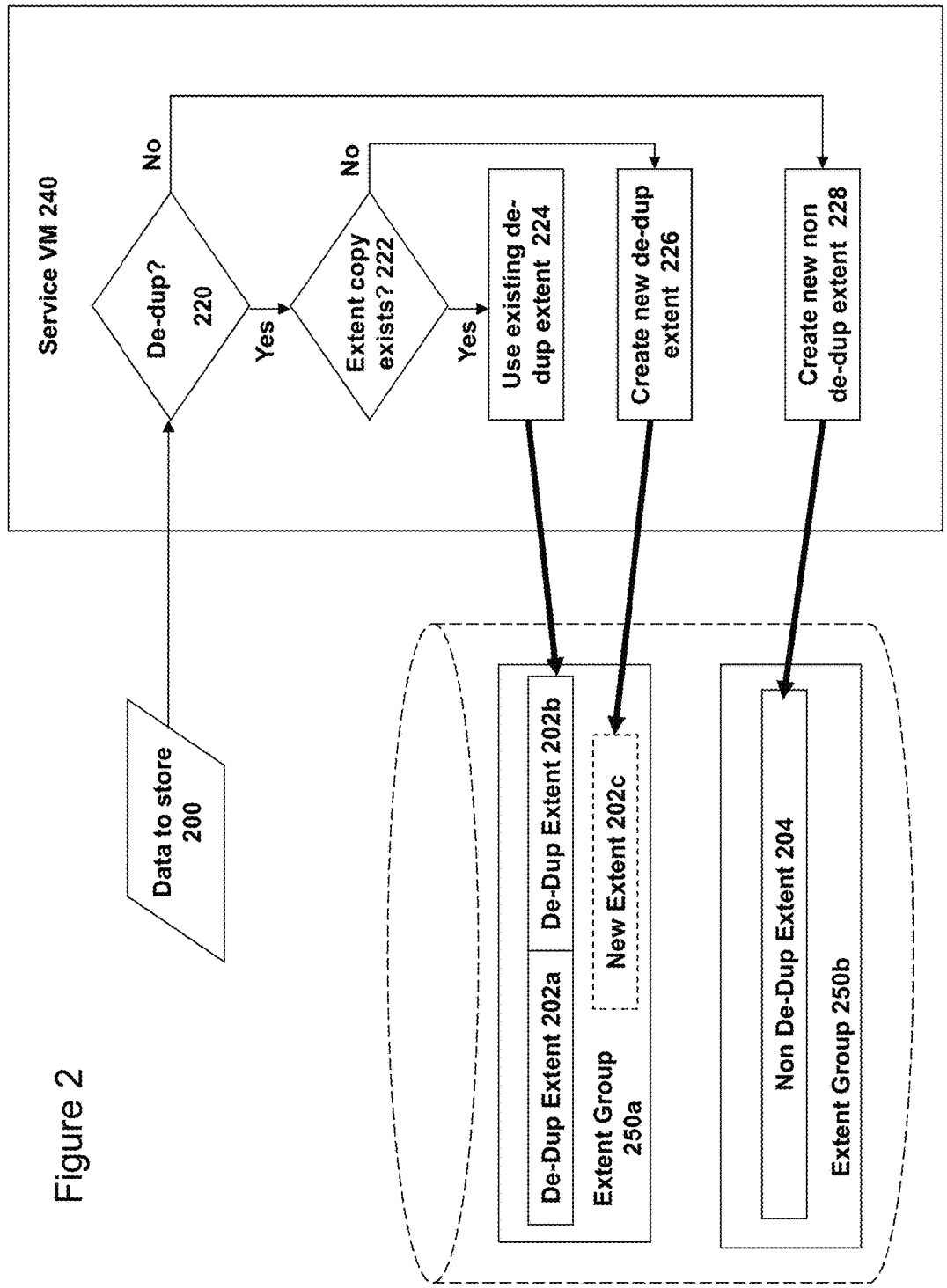
FIG. 2 illustrates an approach for implementing deduplication according to some embodiments of the invention.

The left portion of FIG. 2 illustrates two extent groups 250a and 250b. Extent group 250a includes de-duplication with existing de-duplicated extents 202a and 202b. Extent group 250b includes a non-de-duplicated extent 204. As described in more detail below, new extents (such as extent 202c) can be added to an existing extent group, e.g. the extent group 250a, if there is sufficient space in the existing extent group.

Assume that a user issues an I/O request to write an item of data 200 to storage. The service VM 240 will perform a process to analyze the data item 200 and assign that data item 200 to an extent for storage. At 220, a determination is made whether de-duplication is desired or enabled. If not, then at 228, a new non-de-duplicated extent 204 is created within an appropriate extent group 250b to store the data item 200.

If de-duplication is enabled, then a further determination is made at 222 whether the storage system already includes a copy of that data item. According to some embodiments, this is accomplished by performing "Rabin fingerprinting" upon the data that is being stored. Rabin fingerprinting is a known algorithm for objectively dividing data into consistent portions. This algorithm creates uniform and common boundaries for data portions that are partitioned out of larger items of data. The SHA1 algorithm is applied to the data portion created by Rabin fingerprinting to create a unique signature for that data portion. This is a well-known hashing algorithm that takes any set of arbitrary data and creates a 20 byte content-based signature.

The SHA1 algorithm creates a value that is used as an extent identifier (extent ID), which is further used to determine if an earlier copy of the data item 200 has already been stored in the storage system. If a copy already exists, then a new copy of the data item 200 is not stored; instead, the existing copy stored in de-dup extent 202b is used. A "ref_count" (or reference count) for that extent 202b would be incremented to provide notice that a new entity is now relying upon this extent 202b to store the data item 200.

However, if a copy of the data item 200 does not yet exist, then a new extent 202c is created to store the data item 200.

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations.

Metadata is maintained by the set of Service VMs to track and handle the data and storage objects in the system. Each vDisk corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. The Metadata is used to track and maintain the contents of the vDisks and vDisk blocks.

Figure 3:
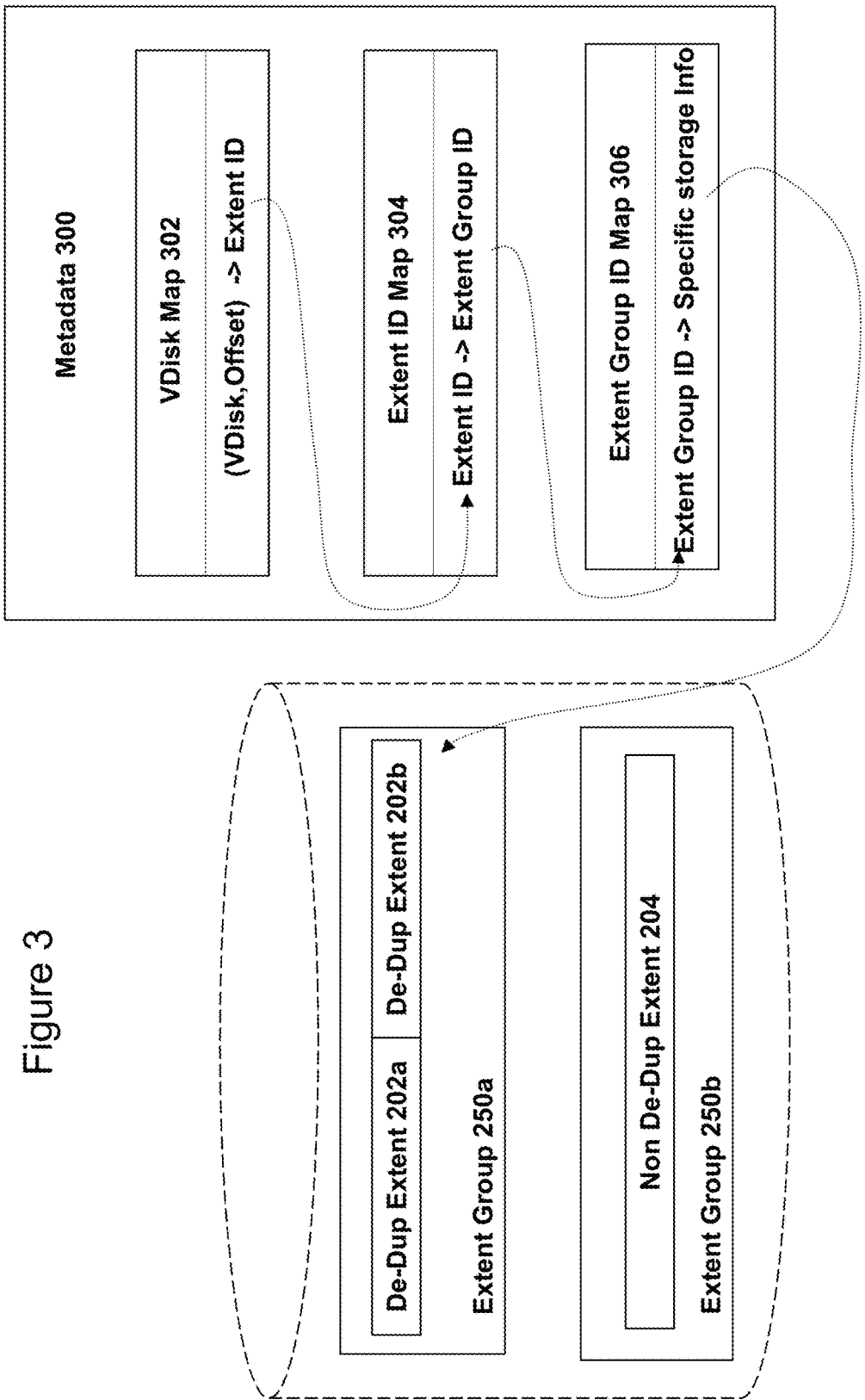
FIG. 3 illustrates metadata for implementing I/O and storage device management in a virtualization environment according to some embodiments of the invention.

As illustrated in FIG. 3, embodiments of the invention maintain three mapping structures as the metadata 300 to track the stored data. A first metadata structure (vDisk map 302) is used to map the vDisk address space for the stored extents. Given a specified vDisk and offset, the vDisk map 302 can be used to identify a corresponding extent ID. A second metadata structure (extent ID map 304) is used to map extent IDs. Given a specified extent ID, the extent ID map 304 can be used to identify a corresponding extent group. A third metadata structure (extent group ID map 306) is used to map specific storage information for extent group IDs. Given a specified extent group ID, the extent group ID map 306 can be used to identify corresponding information, such as for example, (1) disk identifier for the extent group, (2) list of extent IDs in that extent group, (3) information about the extents such as ref counts, checksums, and offset locations.

The vDisk map expects the I/O request to identify a specific vDisk and an offset within that vDisk. In the present embodiment, the unit of storage is the block, whereas the unit of deduplication is the extent. Therefore, the vDisk map is basically assuming the unit of storage specified by the offset information is to a block, and then identifying the corresponding extent ID from that block, where the extent offset can be derived from within the block.

Figure 4:
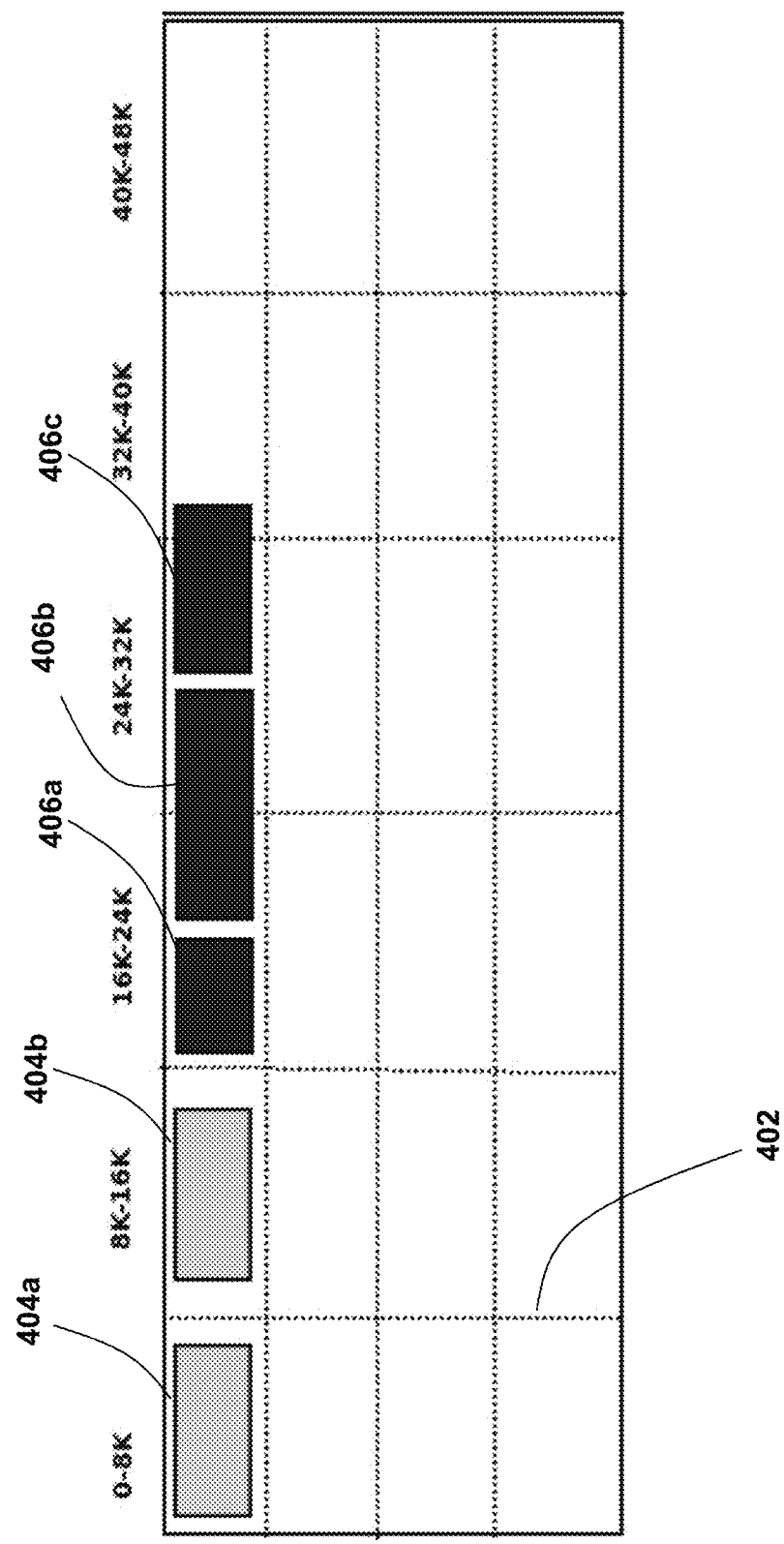
FIG. 4 illustrates block and extent structures according to some embodiments of the invention.

FIG. 4 illustrates the address space of a typical vDisk according to some embodiments. The boxes 402 with dotted boundaries indicate the vDisk blocks which are all of equal size (e.g., 8 KB in this example). The solid boxes 404 indicate the actual extents. As noted above, extents are of two types—ones that are used during de-duplication and ones that are not. The ones that are not used during de-duplication have the same size as that of a vDisk block—the corresponding vDisk block contains exactly one of these extents (extents 404a and 404b in the figure). However, when an extent is used for deduplication, such an extent might be of a variable size. Such extents are shown as extents 406a-c in the figure. Since these extents may not align with vDisk block boundaries, it is possible that such a vDisk block may contain more than one such extent.

The non-deduplicated extents 404a-b are owned by the vDisk and can typically be updated in place. They become copy-on-write only when snapshots are taken. The de-duplicated extents 406a-c are never updated in place.

The discretization into vDisk blocks helps store this information in a table in the vDisk map. Thus, given any random offset within the vDisk, one can discretize it obtain the corresponding vDisk block boundary. A lookup can be performed in the vDisk map for that (vDisk, vDisk block) combination. The information in each vDisk block is stored as a separate column in the table. A collection of vDisk blocks might be chosen to be stored in a single row—this guarantees atomic updates to that portion of the table. A table can be maintained for the address space of each vDisk. Each row of this table contains the metadata for a number of vDisk blocks (e.g., in the figure, each row contains information about 6 vDisk blocks). Each column corresponds to one vDisk block. The contents of the column contain a number of extentIDs and the offset at which they start in the vDisk block.

As noted above, a collection of extents is put together into an extent group, which is stored as a file on the physical disks. Within the extent group, the data of each of the extents is placed contiguously along with the data's checksums (e.g., for integrity checks). Each extent group is assigned a unique ID (e.g., 8 byte ID) that is unique to a container. This id is referred to as the extent group ID.

The extent ID map essentially maps an extent to the extent group that it is contained in. The extent ID map forms a separate table within the metadata—one for each container. The name of the table contains the id of the container itself. The lookup key of this table is the canonical representation of an extent ID. In some embodiments, this is either a 16 byte combination containing (vDiskID, Offset) for non-deduplicated extents, or a 24 byte representation containing (extent size, SHA1 hash) for deduplicated extents. The corresponding row in the table just contains one column—this column contains the extent Group ID where the corresponding extent is contained.

When updates are made to a vDisk address space, the existing extent is replaced by another (in case of de-duplication). Thus the old extent may get orphaned (when it is no longer referred to by any other vDisk in that container). Such extents will ultimately be garbage collected. However, one possible approach is to aggressively reclaim disk space that frees up. Thus, a "ref_count" value can be associated with each extent. When this ref_count drops to 0, then it can be certain that there are no other vDisks that refer this extent and therefore this extent can immediately be deleted. The ref_count on a deduplicated extent may be greater than one when multiple vDisks refer to it. In addition, this may also occur when the same extent is referred to by different parts of the address space of the same vDisk. The ref_count on a non-deduplicated extent may be greater than one when multiple snapshots of a vDisk refer to that extent. One possible approach for implementing snapshots in conjunction with the present invention is described in co-pending U.S. Ser. No. 13/207,371, filed on even date herewith, which is incorporated by reference in its entirety. The ref_count on an extent is stored inside the metadata for the extent group in the extent Group ID map rather than in the extent ID map. This allows batch updates to be made to several extents and to allow updates to a single extent Group ID metadata entry.

To reduce the number of metadata lookups, an optimization can be made for the case of non-deduplicated extents that have a ref_count of one and are owned solely by the vDisk in question. In such a case, the extent ID map does not have an entry for such extents. Instead, the extent Group ID that they belong to is put in the vDisk address space map itself in the same entry where information about the corresponding vDisk block is put.

The extent Group ID map provides a mapping from an extent Group ID to the location of the replicas of that extent Group ID and also their current state. This map is maintained as a separate table per container, and is looked up with the extent Group ID as the key. The corresponding row in the table contains as many columns as the number of replicas. Each column is referenced by the unique global disk ID corresponding to the disk where that replica is placed. In some embodiments, disk IDs in the server/appliance are assigned once when the disks are prepared. After that, the disk ids are never changed. New or re-formatted disks are always given a new disk ID. The mapping from disk IDs to the servers where they reside is maintained in memory and is periodically refreshed.

An extra column can also be provided for the vDisk ID that created this extent group. This is used to enforce the property that only one vDisk ever writes to an extent group. Thus, there is never a race where multiple vDisks are trying to update the same extent group.

In some embodiments, for each replica, some or all of the following information is maintained:

a. The diskID where the replica resides.
b. A Version number.
c. A Latest Intent Sequence number. This is used for maintaining metadata consistency and is explained later in the subsequent sections.
d. The extent ids of each of the extents contained in the extent group. This is either the 8 byte offset for non-dedup extents, or 24 bytes
(size, SHA1) for dedup extents. For each extent, the offset in the extentGroupID file is also contained here. Additionally a 4 byte refcount is also stored for each extent. Finally, an overall checksum is stored for each extent. This checksum is written after a write finishes and is primarily used by a disk scrubber to verify the integrity of the extent group data.
e. Information about all the tentative updates outstanding on the replica. Each tentative update carries an Intent Sequence number. It also carries the tentative version that the replica will move to if the update succeeds.

If multiple replicas share the same information, then that information will not be duplicated across the replicas. This cuts down unnecessary metadata bloat in the common case when all the replicas are the same.

At any time, multiple components in the appliance may be accessing and modifying the same metadata. Moreover, multiple related pieces of the metadata might need to be modified together. While these needs can be addressed by using a centralized lock manager and transactions, there are significant performance reasons not to use these lock-based approaches. One reason is because this type of central locking negatively affects performance since all access to metadata would need to go through the centralized lock manager. In addition, the lock manager itself would need to be made fault tolerant, which significantly complicates the design and also hurts performance. Moreover, when a component that holds a lock dies, recovering that lock becomes non-trivial. One may use a timeout, but this may result in unnecessary delays and also timing related races.

Therefore, embodiments of the present invention provide an approach that utilizes lock-free synchronization, coupled with careful sequencing of operations to maintain the consistency of the metadata. The main idea is that the order in which the metadata of FIG. 3 is accessed will differ between operations that do not change the metadata (e.g., read operations) and operations that will result in a change to the metadata (e.g., write operations).

Figure 5:
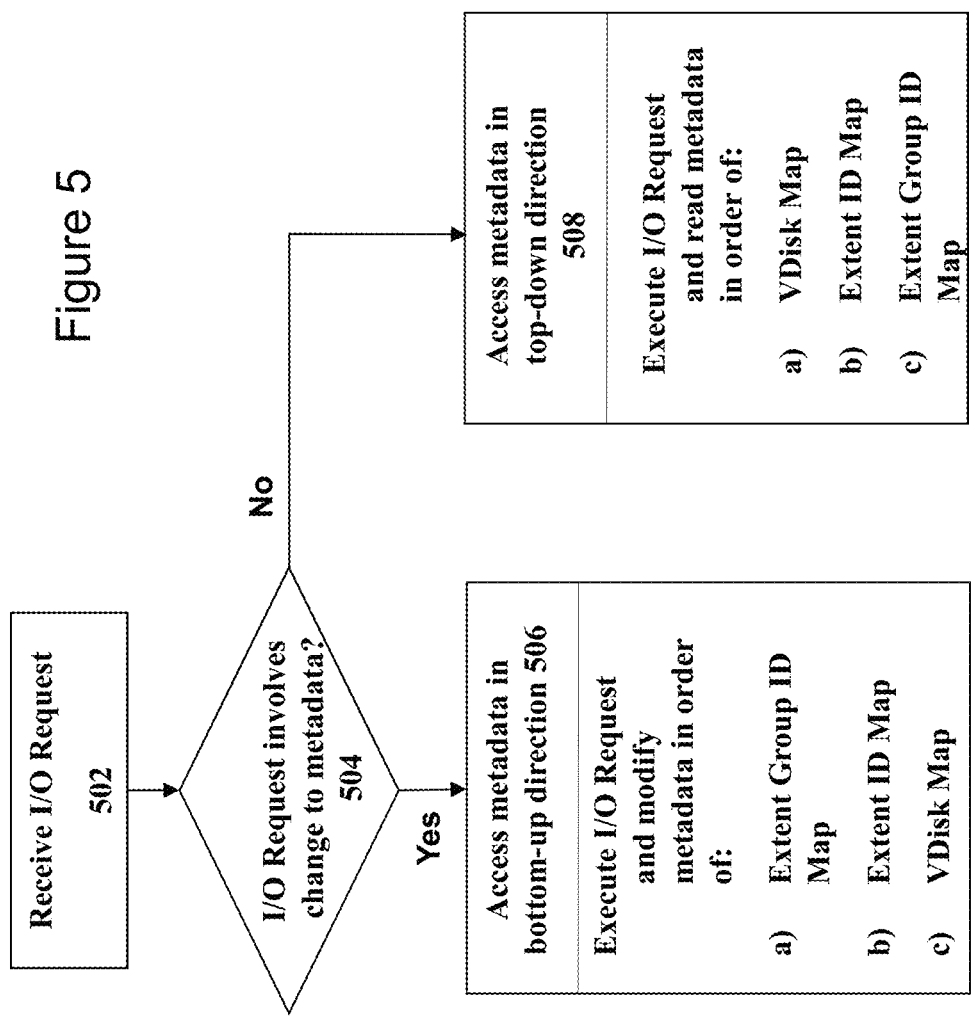
FIG. 5 shows a flowchart of an approach for implementing lock-free metadata access according to some embodiments of the invention.

The high level flowchart of this approach is shown in FIG. 5, in which the I/O request is received at 502. A determination is made at 504 whether the I/O request involves some sort of change or update to the metadata. With regard to the three metadata maps 302, 304, and 306 shown in FIG. 3, read operations should always proceed in a top-down direction starting with vDisk map 302, then extent ID map 304, followed by extent group ID map 306. In contrast, write operations will proceed in the bottom-up direction starting with the extent group ID map 306, followed by the extent ID map 304, and then subsequently followed by the vDisk map 302.

The reason this works is because any dangling or inconsistent references caused by a failure of the write operations in the bottom-up direction should not result in any detectable inconsistencies for the read operations that work in the top-down direction. This is because each layer of the metadata builds upon each other so that in the top-down direction, an extent ID identified from the vDisk map 302 should have a corresponding entry in the next level extent ID map 304, which in turn is used to identify an extent group ID which itself should have a corresponding entry in the extent group ID map 306.

To explain, consider first the opposite situation in which an update/write operation to the metadata is made in same direction as the read operations (i.e., in the top-down direction). Assume that the write operation successively creates an extent ID entry in the vDisk map 302, but dies before it is able to complete the operation and therefore never has the opportunity to create an entry in the extent ID map 304 that maps the extent ID to an extent group ID. In this situation, a subsequent read operation may possibly read that extent ID from the vDisk map 302, but will encounter a dangling/inconsistent reference because that extent ID does not map to anything in the extent ID map 304.

Now, consider if the update/write operation to the metadata is made in the bottom-up direction. Assume that the write operation successively creates a mapping between the extent ID and an extent group ID in the extent ID map 304. Further assume that the operation dies before it is able to finish, and therefore never has the opportunity to create an entry in the vDisk map 302 for the extent ID. This situation also creates a dangling reference in the extent ID map 304. However, unlike the previous scenario, a subsequent read operation will never reach the dangling reference in the extent ID map 304 because it has to first access the vDisk map 302, and since the previous operation did not reach this map, there is no reference to the new extent ID in the vDisk map 302. Therefore, the subsequent read should not be able to find a path to reach the dangling reference in the extent ID map.

In this way, the present approach inherently maintains the integrity of the metadata without needing to provide any central locking schemes for that metadata. Crashes may result in some excess data, but that excess data should not result in fatal inconsistencies, and can be efficiently cleaned up by a garbage collection process at a later time.

Figure 6:
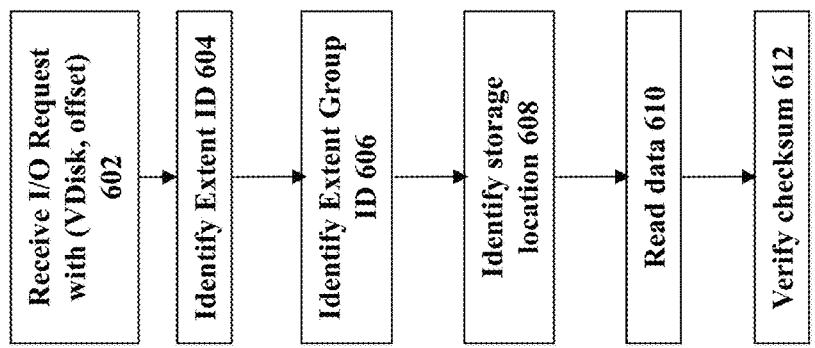
FIG. 6 shows a flowchart of an approach for implementing top-down metadata access according to some embodiments of the invention.

FIG. 6 illustrates a more detailed flowchart of an approach to implement top-down access to the metadata, where the access does not require a change or update to the metadata. At 602, an I/O request is received that specifies the vDisk and offset at which the access will occur. The I/O request will also identify the number of bytes that need to be accessed (e.g., read) from that vDisk and offset.

At 604, the vDisk map is accessed to identify the extent ID that corresponds to the specified vDisk and offset. With that extent ID, the extent ID map is accessed at 606 to further identify the corresponding extent group ID.

At 608, the extent group ID is used to query the extent group ID map, to gather storage information for the specified extern group ID. This provides, for example, the disk ID(s) at which the extent ID is located. Assuming that there are multiple storage locations, then the most efficient location may be identified for the data access. For example, if one of the available locations is for a locally attached storage device, then that device would be the preferred device for the data access. At 610, the data would be read from the identified extent. At 612, the checksum value for the data (stored in the extent group ID map) is checked to ensure that the data has not been corrupted.

Figure 7:
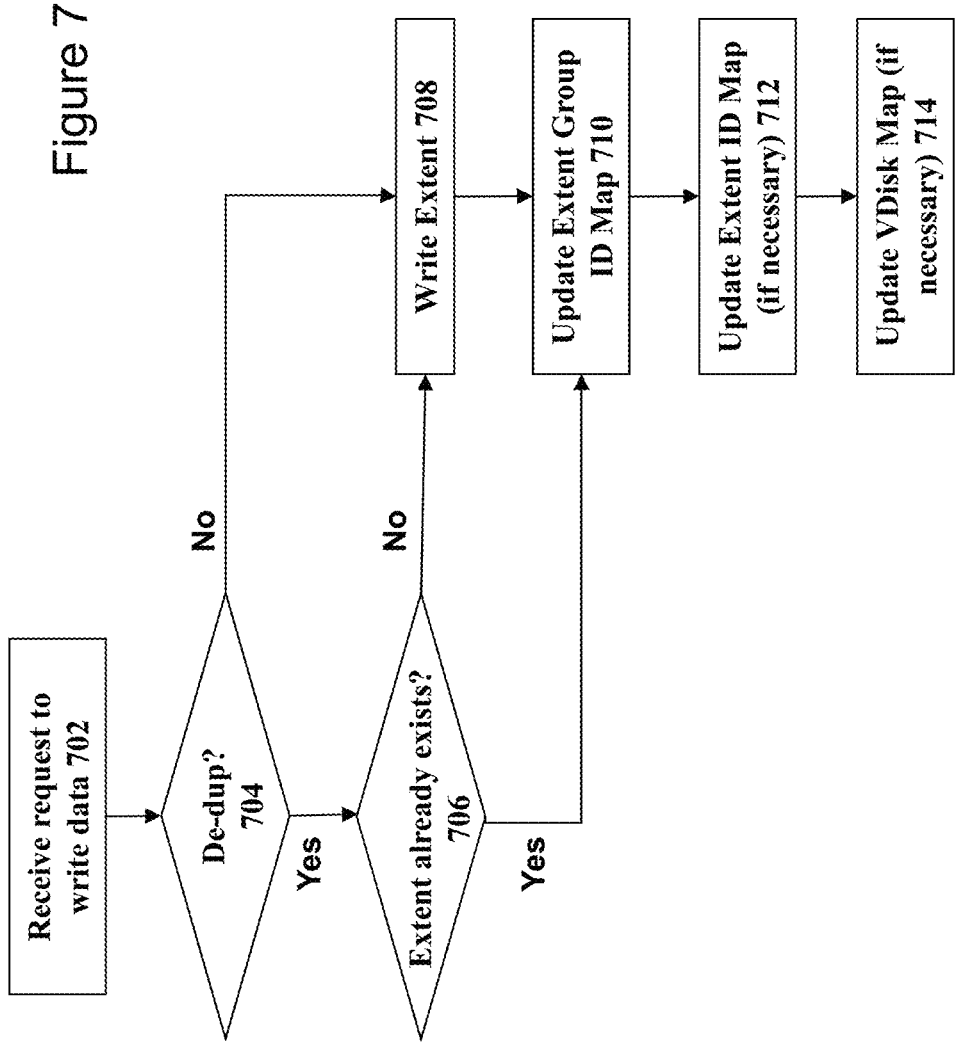
FIG. 7 shows a flowchart of an approach for implementing bottom-up metadata updates according to some embodiments of the invention.

FIG. 7 illustrates a more detailed flowchart of an approach to implement bottom-up access to the metadata for I/O request that will involve a change or update to the metadata. At 702, an I/O request is received that specifies the vDisk and offset at which the access will occur. The I/O request will also identify the number of bytes that need to be written to that vDisk and offset.

A determination is made at 704 whether or not de-duplication has been enabled. If not, then at 708, a new extent is created to store the non-deduplicated data. If deduplication is turned on, then at 706 a further determination is made as to whether the extent already exists. This is verified by checking whether the SHA1 value corresponds to an extent ID that already exists in the storage system. If the extent does not already exist, then at 708 a new extent is created to store the deduplicated data.

At 710, the extent group ID map is modified. If the extent is newly created, then the entry is updated to reflect the new extent. If the extent already exists, then the entry is modified by incrementing the ref_count. Additional information may also be included or modified in the extent group ID map. For example, the checksum may also be added to the metadata at this time. While the present illustrative discussion centers on write operations, it is noted that a similar set of changes will occur for delete operations, e.g., by decrementing the ref_count value.

After the extent group ID map has been completely updated, then at 712, modification occurs to the extent ID map if necessary. The extent ID map may need to be updated if the extent has been newly created, so that a mapping exists in the extent ID map between the new extent ID and the extent group ID.

After the extent ID map has been completely updated, then at 714, modification occurs to the vDisk map if necessary. The vDisk map is updated so that a mapping exists in the vDisk map between the new extent ID and the vDisk and block locations.

There are certain race scenarios that may occur which should be addressed. For example, consider if there is a race to access the same metadata between a read operation and a write operation. It is possible that the write operation may cause inconsistencies to occur that are detected by the read operation.

Figure 8:
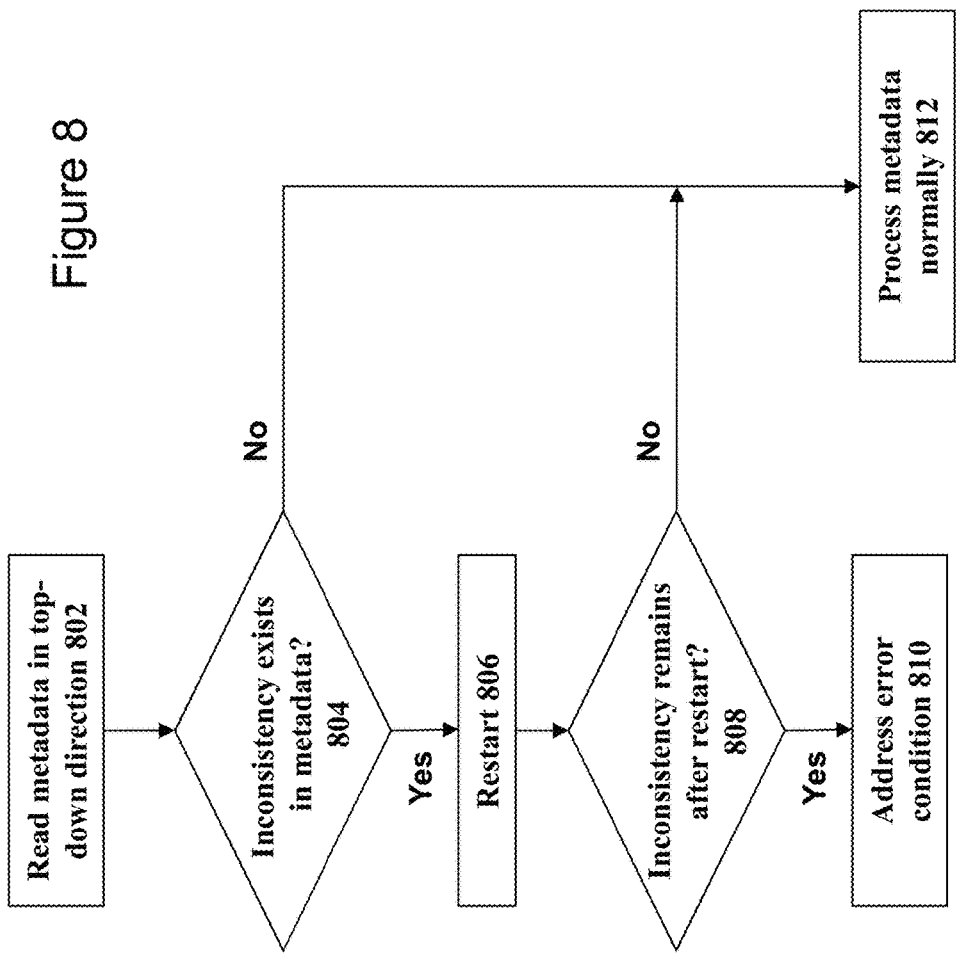
FIGS. 8-10 show flowcharts of approaches for handling certain race conditions according to some embodiments of the invention.

FIG. 8 is a flowchart of an approach to handle such race conditions according to some embodiments of the invention. At 802, the read operation will proceed in the top-down direction as described above. A determination is made at 804 whether there is an inconsistency within metadata, e.g., because of the race between the read operation and another write operation.

Assume that such a race situation did in fact occur, and the read operation has now encountered a dangling reference or some other type of inconsistency. To address this, at 806, the operation goes back upwards to re-start the access to the metadata. The hope is that the restart will give the other operation the opportunity to finish, so that any intermediate inconsistencies caused by the other operation will get resolved before it is once again encountered by the current operation. Therefore, the next time through the metadata access in the top-down direction, another check is made at 808 to see if the inconsistency has been resolved (or if it still exists). If the inconsistency has been resolved, then at 812, the metadata access will proceed normally. Otherwise, at 810, error handling will need to occur to address the problem.

Another possible race situation may occur is that two competing operations may seek to both update the same item of metadata at the same time. To address this situation, a "compare and swap" (CAS) operation is implemented for the updates to the metadata. The CAS operation is performed by making sure the metadata at the beginning of the operations remains unchanged all the way through the completion of the operations. If the metadata changes somewhere in the middle of the operation, then this is an indication that another competing operation is simultaneously changing the metadata.

Figure 9:
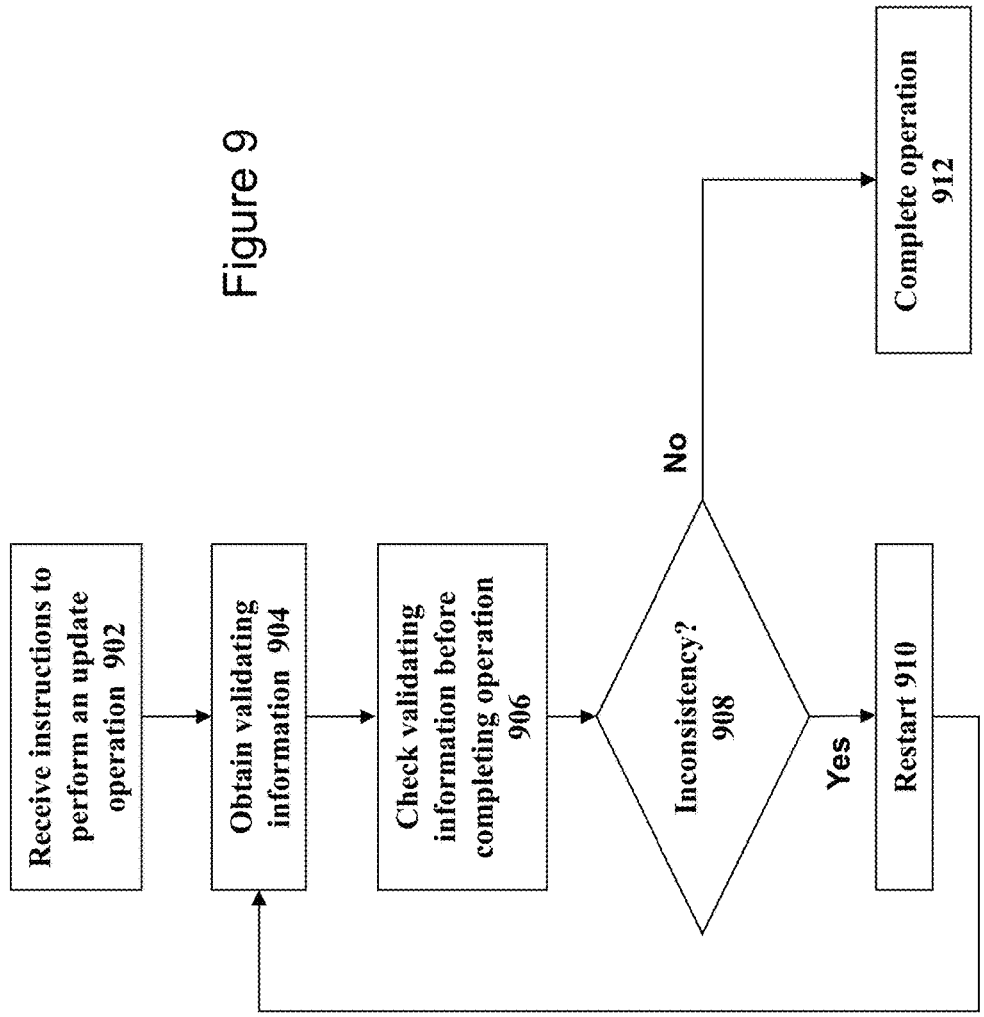

FIG. 9 shows a flowchart of an approach to handle this type of race situation. At 902, instructions are received to perform an update operation to the metadata. At 904, validating information is obtained for the metadata. Such validating information may include, for example, a timestamp for the metadata or a checksum for the metadata.

At a later point in time just prior to completing the operation against the metadata, the saved validating information for the metadata is checked again to make sure it has not changed (906). If there is no inconsistency, then this means that a race condition does not exist or that the current operation has won the race. As a result, the current operation is permitted to complete the update to the metadata at 912.

On the other hand, if there is an inconsistency, then this means that another operation has modified the metadata in the interim. Therefore, at 910, the operation will restart, with the hope that the restart will allow the operation to proceed without losing another race.

According to some embodiments, the CAS operation will provide the property of being a time bounded operation, in which read/write operations will not take more than a certain time period to finish (e.g., seven seconds). A read/write operation would either succeed or fail in less than the specified time period T seconds after it started. If the backend is unable to complete a write operation in T seconds, it will report the operation as a failure, but the write may still succeed afterwards. A subsequent read operation after a failed write operation though, would provide the latest value for the key which would remain consistent with subsequent reads. In addition, the CAS operation will provide "read after write consistency", in which once a write succeeds, all subsequent reads return the value that was written, until the next write happens. If a read is racing with a write (write has not finished and the read was received within the designated number of seconds of the write operation) then the backend store may return either the old value or the new value being written. "Atomic" CAS is implemented, such that provided key k, current value v and a new value v', backend store would be able to atomically overwrite the current value v with new value v'. If the current value of key k is not same as v then the atomic CAS operation would fail. Repeatable reads consistency is also provided, such that two read requests for a key k would return the same value v provided there was no write received between the two reads or within T seconds of the time when the reads started. If read r1 started at time t1 and read r2 started at time t2 with t1<t2, then if there was no write received between time [t1−T, t2+T], reads r1 and r2 would both return the same value v.

According to some embodiments, the CAS functionality is provided by taking advantage of a consensus algorithm, e.g., as described in "Paxos Made Simple", ACM SIGACT News (November 2001). Each column value (cell value) would be chosen by running a Paxos instance among the replica nodes for the cell. Each time a cell value is to be changed, a new Paxos instance for the cell would be executed. During a Paxos instance, once a value is accepted at a replica node, it displaces any older value the node may have accepted earlier (from any previous or current Paxos instance). The current accepted value becomes the latest value stored at the replica node. Thus, at a time, a replica node stores only a single (latest) value for a cell. On a read, a replica node replies with its latest local value. One advantage provided by embodiments of the invention over the base Paxos approach is that the present embodiment can detect and address CAS situations involving multiple operations, e.g., multiple write operations. In this situation, some embodiments operate by ensuring that multiple operations go together, so that failure of one of the multiple operations will result in all of those multiple operations to restart.

For each cell value stored at a replica node, the approach stores the Paxos instance number in which the value was accepted at the node along with value's Paxos proposal number. Also a boolean value is stored that indicates whether the replica node has made any promise for a proposal number for the next Paxos instance. Also stored is an "epoch" associated with the current accepted value at the replica node. The epoch is used to identify a sequence of writes for a cell starting from the first write (for instance 0 or 1) until the last write for the cell (the last write being deletion for the cell). Once a cell is deleted the epoch associated with the cell is also destroyed. The next write for the cell (for instance 0) will have a different bigger epoch value and every write for the cell then would contain the same epoch value until the cell gets deleted again. At any single point of time, all the replica nodes for a cell will have the same epoch value for the cell. Reads are initiated through "leader" node. Leader is an alive replica node whose id is lexicographically the first amongst all the alive replica nodes for the key. Writes would also proceed through the "leader" node.

Deleting a cell involves getting the deletion record chosen for the latest instance. Once a deletion record for a value is chosen, one would like to clear all state for the cell from all the replica nodes. This is a notable situation since forgetting all state about a cell can lead to a circumstance where an older write (for an instance before the deletion record got chosen) for the cell can get accepted. Once a deletion for a cell has occurred, the next write that should succeed should be for instance "0" and not for any other instance. Also, older writes generated by a client for a CAS on a value (Paxos instance) from before the deletion happened has to be rejected by the system.

For example: assume that there are two clients in the system: "c1" and "c2". Further assume that c1 wrote a cell with instance 0 and then c2 obtains a deletion record for the cell chosen at instance 1. Afterwards c2 wrote a new value for the cell for instance 0. Assuming that c1 does not know about the writes "c2" did and c1 without performing a read for the cell generates a new write for instance 1. Now c1 when generating the write for instance 1 thinks it is performing CAS for the older instance 0 value for the cell. In between c2 already deleted and got a newer value chosen for the cell but the instance of the newer value still remains as 0. If Paxos is run for the c1 generated write for instance 1, the write will succeed and c1's proposed value will win. This is clearly an inconsistent CAS write and such a case needs to be avoided. Another case in which an older write can win is when the deletion for the cell didn't occur on all replica nodes. Assume that there are three replica nodes "r1", r2 and r3. At the time of deletion r3 was down but since a quorum was up, the deletion record got chosen for instance i. Now r3 still has record for instance i−1. If r1 and r2 delete all state about the cell once the deletion record got chosen, then when r3 comes back up it can assert (propose) its value at instance i−1 being the current value for the cell. Nodes r1 and r2 cannot stop r3 from asserting (proposing) the value at i−1 if they do not have any state for the cell.

In some embodiments, there are certain properties that are desired for the system to satisfy post deletion for a record, including for example: (1) if deletion occurs for instance i all CAS writes for older values in instances 1 to i−1 must not succeed on the system; and (2) any older write(s) that were accepted at any replica from before the deletion happened cannot be asserted (proposed) by the replica after the deletion has happened.

In some embodiments, a unique id ("epoch") is used to identify a sequence of writes for a value. During a lifetime for a cell, from its first write until its last write (deletion for the cell) the epoch for the cell remains the same. The CAS writes for the cell thus happens on the "<epoch, instance>" tuple and not just on instance. When a leader runs Paxos write for deletion of a cell, it tries to get the special deletion value chosen for the cell for latest instance.

While running Paxos for the delete, there are several possibilities that may occur. One possibility is that the Paxos run for the deletion fails. In this case, nothing should be done, and a failure is returned for the deletion to the client. Another possibility is that the Paxos run for the deletion is successful and the special deletion value is chosen for instance i. If all the replica nodes accepted the delete value then leader runs a 2 phase commit. It will send a message to all replica nodes to get ready to delete the cell value forever, and this also indicates to all replica nodes that the delete value got chosen. Once all replica nodes acknowledge this message, leader sends the final "delete forever" message to all the replica nodes. Alternatively, if some replica nodes did not accept the delete value during the Paxos run (e.g., some nodes may be down) then a tombstone for the delete is kept. The leader sends the tombstone chosen value to all the replica nodes. This signifies that the delete was successful (chosen) but it can't be removed from the disk because an older write for the cell may still be lingering on in some replica node(s). Once a replica node receives information about the fact that a delete was chosen (either tombstoned, or to be deleted forever) then it can successfully prepare/accept messages for a new epoch for instance 0. Otherwise if the node does have the "delete" value accepted but doesn't know about whether the delete was chosen then it can't accept a write for a newer epoch.

As noted above, a read operation can be performed by providing a particular key value and instance value, which returns the value that has been established, by consensus, as the absolute value of that specific key for that specific instance. Once that value is chosen for that key/instance combination, then that value will always be returned for a read operation that specifies that key/instance combination. When performing a write operation, the key is provided along with the value to write for that key. The write operation cannot write to an existing key/instance combination (k, i), and will therefore cause an increase to the instance count so that the write operation writes the value to an incremented instance count for that key, e.g., (k, i+1). The instance i may correspond to any suitable type of data, and in some embodiments is an integer that has a starting value of either 0 or 1, and which is monotonically increased for each new write operation for a given key.

One possible problem that may occur is when a node attempts to write a new value for a key in which the write operation succeeds locally, but where a node failure occurs prior to a successful consensus that establishes that new value with the other nodes in the system. This situation may raise, for example, a potential "replicated read" violation among the nodes.

To explain, consider a system that includes three nodes (node A, node B, and node C), where the current instance value is 1, and the current value of the key value combination (k,i) is 100. Assume that Node A locally performs a write operation that increments i to i+1, and which locally writes the value 200 for the key/instance combination (k,i+1). Further assume that before the results of this write operation can be confirmed by consensus (e.g., a quorum is not reached for this value), node A undergoes a failure and goes down. At this point, neither of the other two nodes (node B and node C) are aware of the write operation made by node A having updated the key value, and any read operations made by nodes B and C for key k will retrieve the value of 100 for the (k,i) key/instance combination. However, when node A comes back up, it can run a consensus algorithm and succeed the partial write for value 200. Now even though the user did not generate a new write, the earlier partial (failed) write succeeded even though it is in-between the reads which returned the older value of 100. From the user's point of view it would appear as if the value 200 suddenly came into existence in the system. Therefore, reads will continue returning the value 100 and then suddenly without a new write being submitted, results in a system-returned value 100. This situation creates a replicated reads violation.

Figure 12:
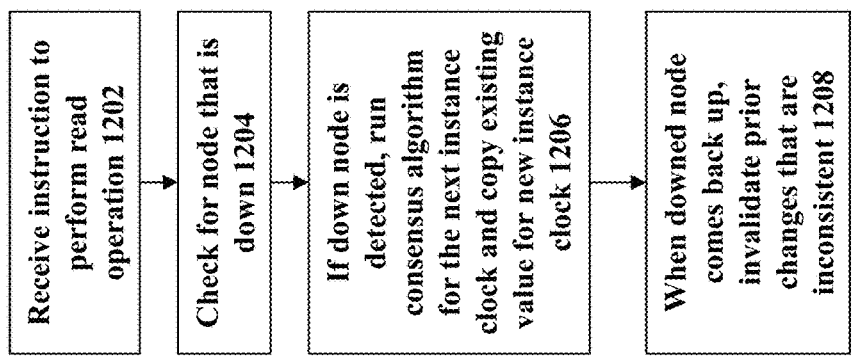
FIG. 12 shows a flowchart of an approach for perform operations to address downed nodes according to some embodiments of the invention.

FIG. 12 shows a flowchart of an approach to address this situation. At 1202, an instruction is received to perform a read operation. At 1204, a determination is made whether there are any nodes that are currently down. If there are any downed nodes, then this creates the possible problem that the downed node had made changes to the data which is not known by the other nodes.

If the a downed node is detected, then at 1206, a consensus algorithm is run for the next instance (i+1) and the current value (k,i) is chosen for instance i+1 as well. If (or when) the downed node comes back up, and if that downed node had previously made a write operation for (k, i+1), then an inconsistency can be identified (1208). Using a consensus algorithm (such as Paxos), the inconsistent prior changes by the formerly downed can thereafter be invalidated.

Figure 13B:
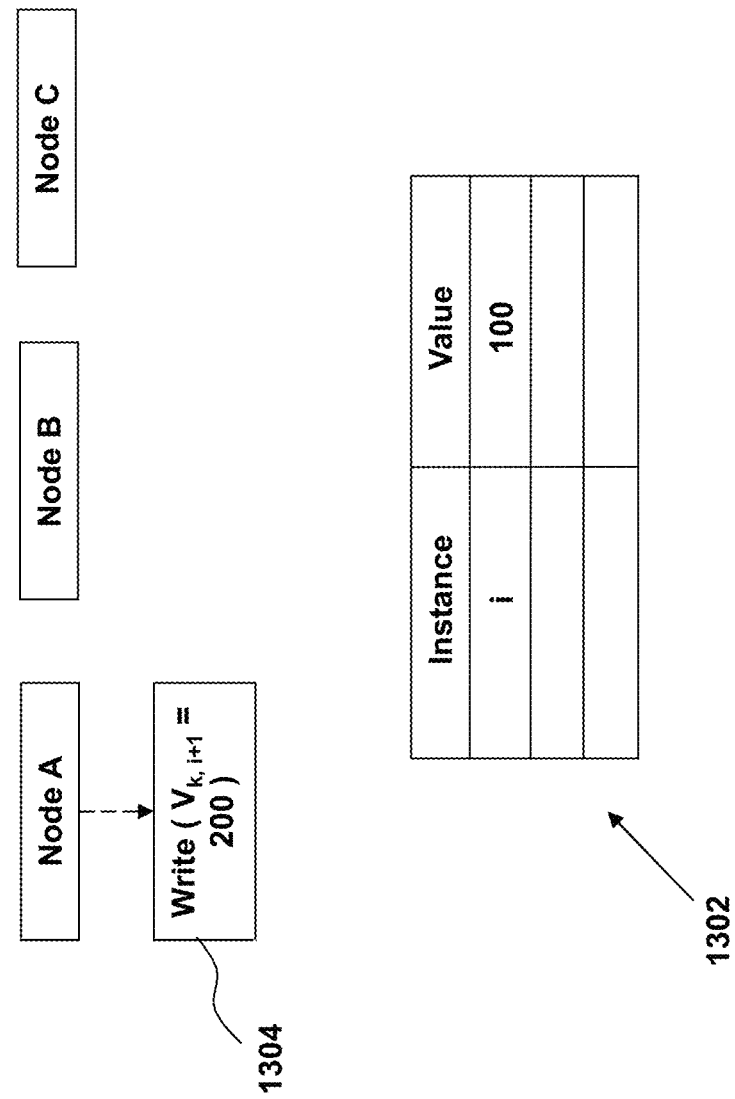

FIGS. 13A-G illustrate this process. FIG. 13A shows a system having three nodes A, B, and C. The table 1302 shows the values for a given key/instance combination. As shown in this figure, the current instance count is i, and the value for (k,i) is 100.

Assume that node A wishes to perform a write operation to write the value 200 for key k. Since the current instance count is i, the write operation will need to increment the instance count to i+1. As shown in FIG. 13B, a local write operation 1304 will be performed at node A that writes the value 200 for (k,i+1). However, before the new value can be propagated to the entire system (e.g., before a quorum has formed to agree upon the new value), node A suffers a failure and goes down as shown in FIG. 13C.

At this point, neither of the other two nodes (node B and node C) are aware of the write operation made by node A for (k,i+1), and the consensus values in table 1302 do not reflect the write operation made by node A.

Figure 13F:
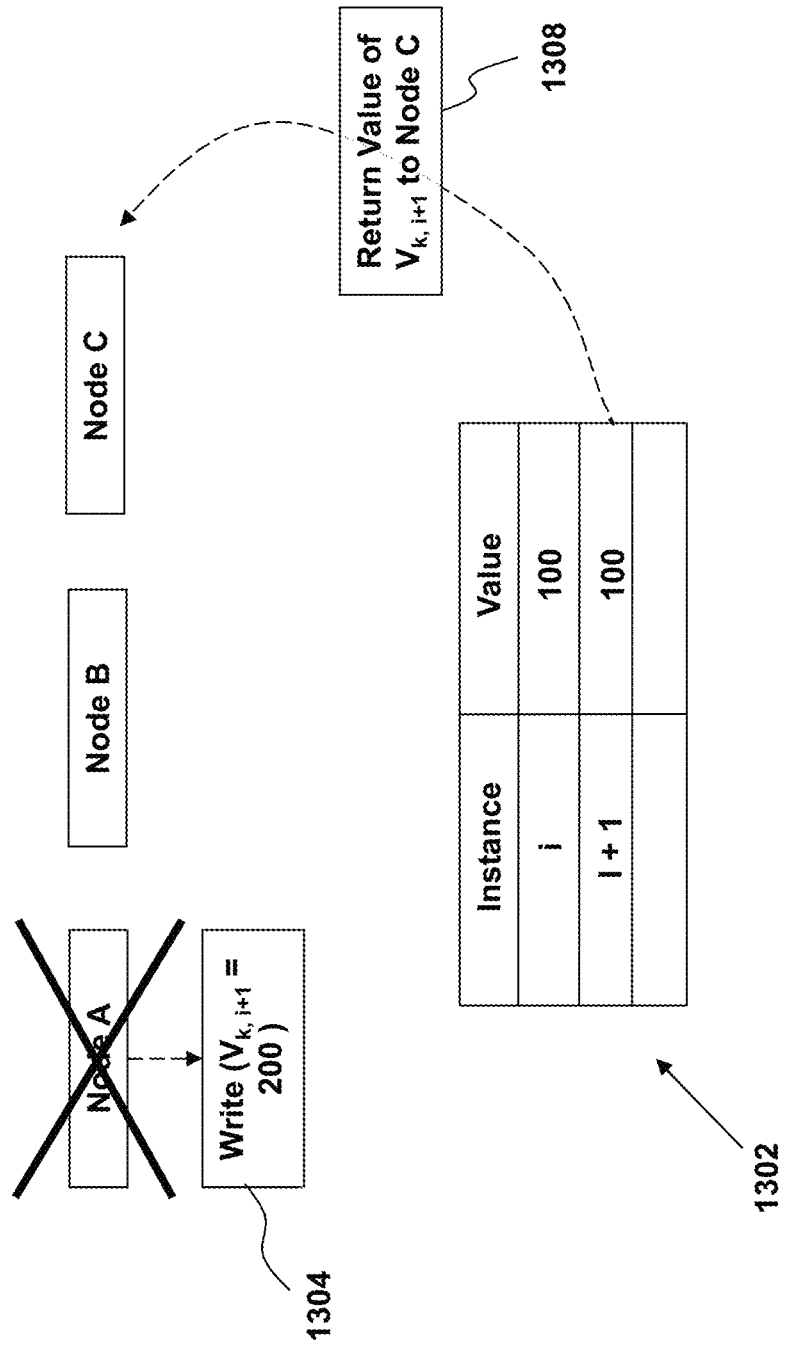

FIG. 13E shows when a subsequent read operation 1306 is issued by node C for key k. At this point, a determination is made whether there are any downed nodes in the system. Here, a detection is made that node A has gone down. Therefore, according to the current embodiment of the invention, a consensus algorithm will be run for next instance (i+1). In addition, the value for (k,i+1) will be copied from the value for (k, i). Thereafter, as shown in FIG. 13F, the read operation 1306 will result in the value of (k, i+1) to be returned to node C.

Figure 13G:
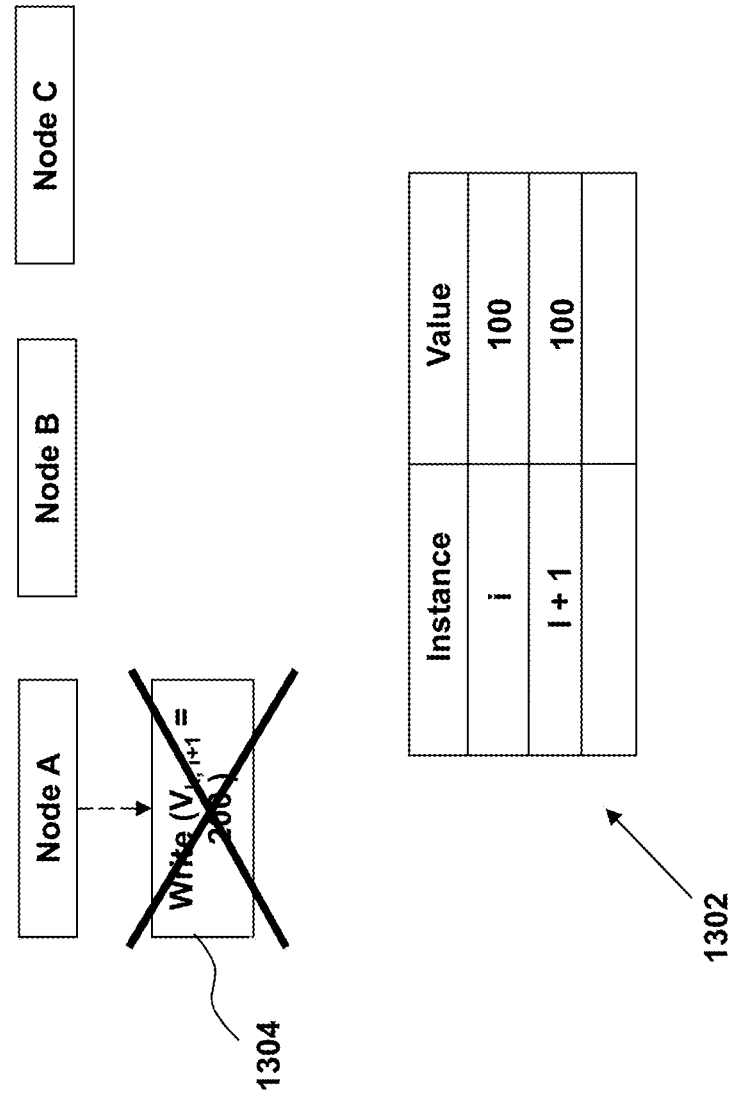

It is possible that node A will later be brought back up, as shown in FIG. 13G. At this point, there is an inconsistency between the write operation 1304 (which has a value of 200 for (k, i+1) and the consensus value of 100 for that same key/instance combination as recorded in table 1302. As a result, the write operation 1304 is invalidated, thereby preventing a violation of repeated read principles.

The above example does not perform any "delete" operations, and therefore the concept of an "epoch" is not described for purposes of simplifying the explanation. However, it is noted that tuples with the format <epoch,instance> can also be employed within embodiments of the invention, particularly when deletes are performed. For example, in some embodiments, the tuple format <epoch,instance> is always used, but the "epoch" value will stay the same when delete operations are not being performed. Therefore, when a delete occurs, the epoch value will change. This point is also applicable for the row CAS (compare and swap) described further below.

Figure 14:
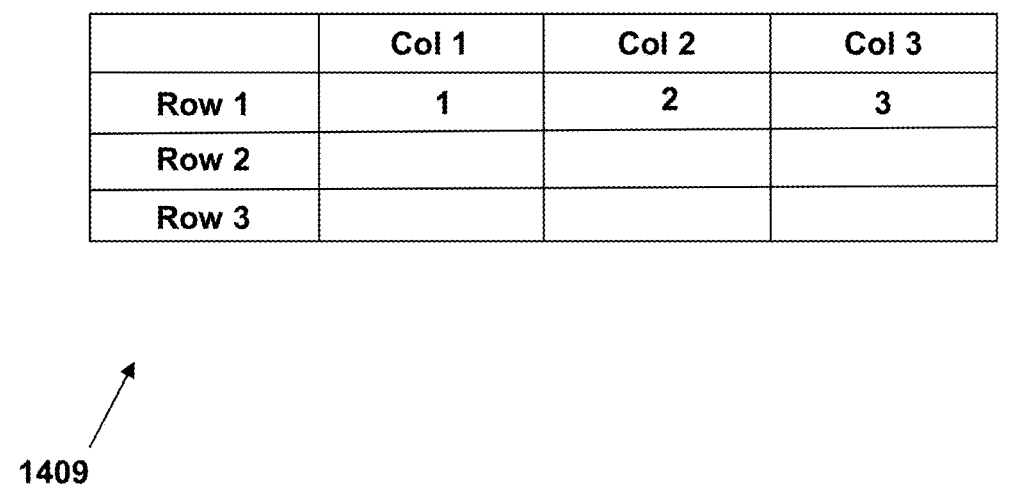

In some embodiments, a table structure is used to maintain the values of key values, where each key value is associated with its own entry in the table. FIG. 14 provides a simple example of a table 1409 that can be used to track these key values, where each entry or cell is associated with a distinct key. When a write operation is performed for a key, the updated instance count for that key is associated with the cell for that key. For example, assume that cell (row 1, col 1) is associated with a key for which a value was written at instance 1. This means that the instance value of 1 should be associated with that cell (row 1, col 1) as shown in FIG. 14. Similarly, it can be seen that the value of the key associated with cell (row 1, col 2) was written at instance 2, and the value of the key associated with cell (row 1, col 3) was written at instance 3.

Even though there are different cells associated with a specific row, it is possible that the cells for the same row pertain to a collective set of data for which instance counts must be incremented when performing write operations. Therefore, even though cell (row 1, col 1) is currently associated with an instance value of 1, a subsequent write operation for the key associated with this cell will need to increment from the highest instance value for that row (i.e., from instance value of 3 as set for cell (row 1, col 3)). Implicitly, this means that there is an instance value for the entire row. Therefore, the highest instance count for the entire row needs to be known in this type of system.

Figure 15A:
FIG. 15A illustrates an improved table to track values according to some embodiments of the invention.

As shown in FIG. 15A, this is addressed in some embodiments by including another column for the table 1509 to track the instance value for the row. In this way, row-based CAS can be very efficiently performed by checking the value of the instance count column for the row of interest.

Figure 15B:
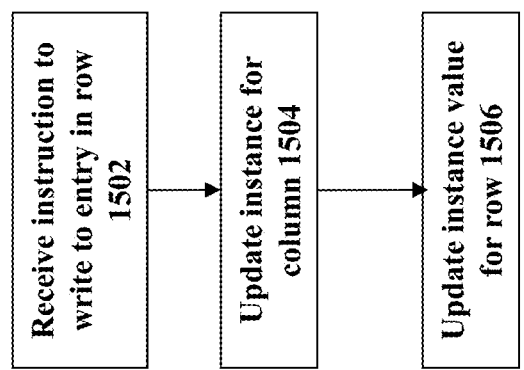
FIG. 15B shows a flowchart of an approach to update an improved table to track values according to some embodiments of the invention.

FIG. 15B shows a flowchart of an approach to implement tracking of row-based instance counts. At 1502, an instruction is received to write to a specific entry in a row. At 1504, the instance value for that entry is updated as appropriate. Thereafter, at 1506, the instance entry for the entire row is modified with the new instance value.

Consider another possible problem that may occur when using the aforementioned table structure, when a node that attempts to write to table undergoes a failure during the write process. Similar to the process described above, detection of a down node will result in a subsequent read to increment the instance value for an entire row in the table. This prevents consistent read violations when a node fails while updating existing entries in a table.

However, consider the situation when the failed node was adding new columns to the table at the time of failure. In this scenario, even if the subsequent read operation increments the instance count sufficient to invalidate modifications made to existing columns of the table, this still may not resolve possible problems relating to new columns in the row that was not known to the other nodes.

In some embodiments of the invention, this problem is addressed by considering all other rows (e.g., rows not known to the surviving nodes added by the failed nodes) to be deleted upon occurrence of a subsequent operation by a non-failed node. A delete clock can be maintained to track the time at which a subsequent operation is performed from a surviving node. Any columns with a "time" that is less than the delete clock would be considered as "deleted". Therefore, if the failed node that had previously added new columns is brought back up after the delete clock has been set by another node, then the previously added columns would have a time that is smaller than the delete clock, which would render those columns as being considered deleted.

Figure 16:
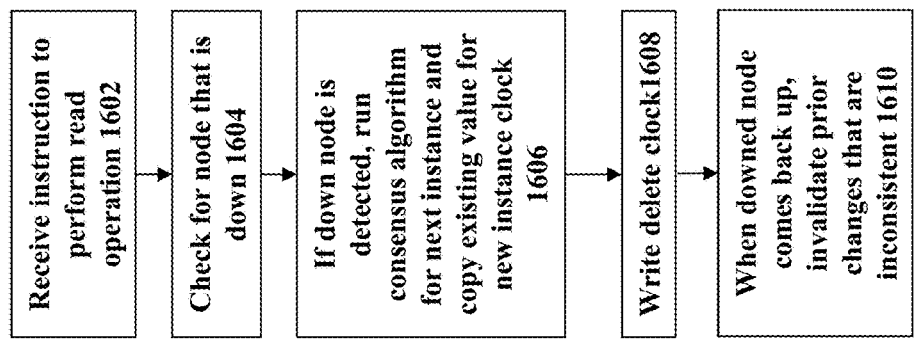
FIG. 16 shows a flowchart of an approach to perform operations to address downed nodes with the possibility of unknown columns according to some embodiments of the invention.

FIG. 16 shows a process to implement this process. At 1602, an instruction is received to perform a read operation. At 1604, a determination is made whether there are any nodes that are currently down. If there are any downed nodes, then this creates the possible problem that the downed node had made changes to the data which is not known by the other nodes. If the a downed node is detected, then at 1606, a consensus algorithm is run for instance (i+1) and the previous value for (k, i) is coped to the value for (k,i+1). For the table approach described above, the contents of the entire row would be copied for the new instance. At 1608, the delete clock is set.

If or when the downed node comes back up, and if that downed node had previously made a write operation for (k, i+1), then an inconsistency can be identified. Using a consensus algorithm (such as Paxos), the inconsistent prior changes by the formerly downed can thereafter be invalidated at 1610. In addition, any columns that had been added by the downed node would be considered deleted for having an associated time that is less than the deleted clock time.

There are generally some scenarios in which race situations are expected to occur, and therefore can be directly addressed without the need to perform "restarts" of operations as described above. For example, consider the situation in which a user wishes to write a large volume of data, and the data is likely to be sequentially written to the same extent group. In this situation, it is highly predictable that multiple operations will seek to update portions of the same set of metadata. Since this situation can be predicted, there are more efficient ways to handle the potential conflicts without resorting to the standard approach of waiting for the conflicts to be detected, and then having the operations restart upon detecting the conflict.

The more efficient approach is to recognize these situations upfront, and to "cheat" by allowing the operations to become aware of the intent of the other operations. In this way, the operations do not get blocked by the other operation. Importantly, the operations will not need to restart even upon a change to the metadata timestamp or checksum, since the intent of the other operation is known and can be accounted for.

One way to implement this approach is to create an intent log to be written somewhere before a change to the metadata is done. The intent log can be created in a way that it is accessible by the other operations, e.g., within a set of common state if both operations are running within the same service VM. The tentative updates by the operations to the extents are posted to the intent log.

Figure 10:
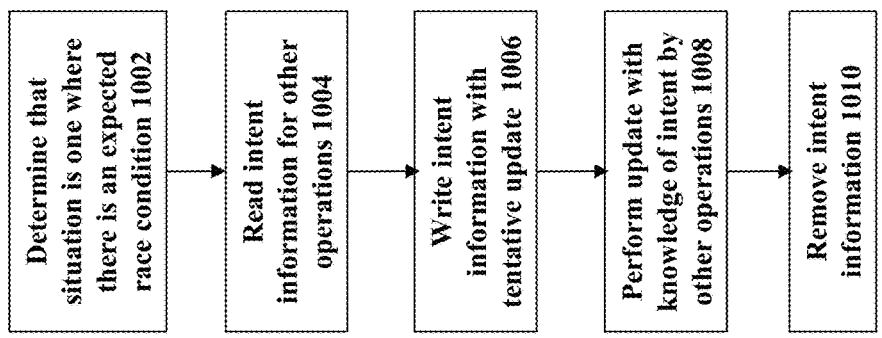

FIG. 10 shows a flowchart of an approach for implementing this optimization according to some embodiments of the invention. At 1002, a determination is made that the situation is one in which there is recognition of the expected race condition. At 1004, the intent log is checked for the intent of the other operations. In addition, at 1006, the current operation will also write its intent information into the intent log.

Thereafter, at 1008, the current operation can proceed with its update to the metadata, with knowledge of the intent of the other operations. Even if the metadata changes in the interim, this will not affect the ability of the current operation to proceed, subject to those changes corresponding to the intentions of the other operations as posted within the intent log. After the operations have completed, the intent information can be removed from the intent log at 1010. The checksum information can also be updated at this time.

Figure 11:
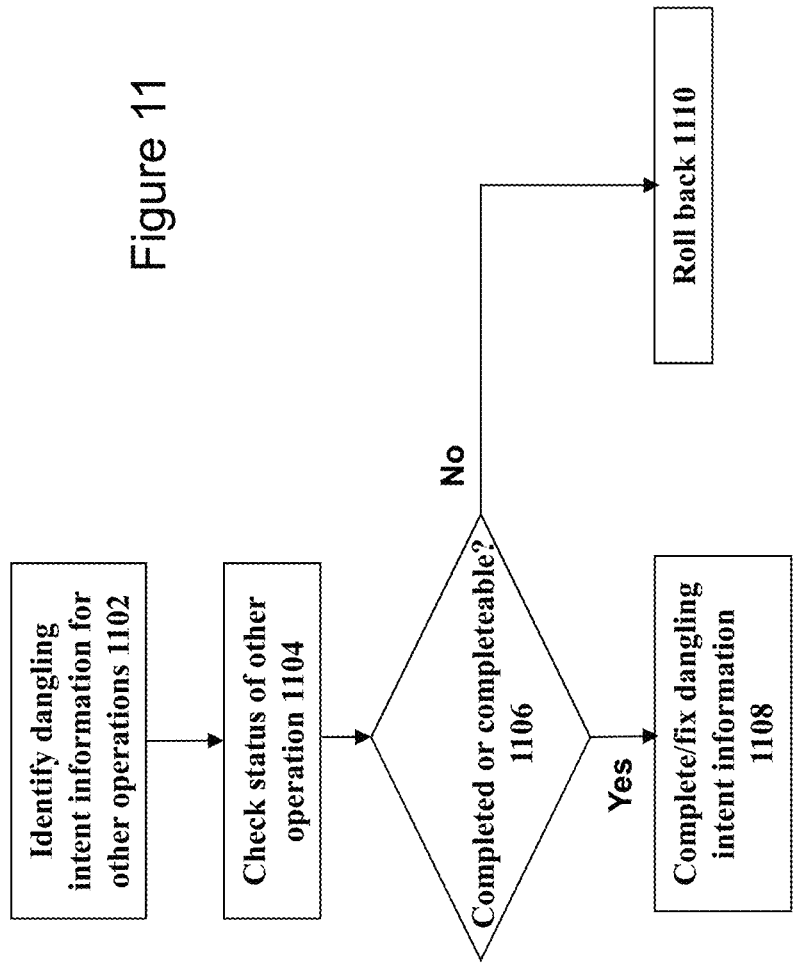
FIG. 11 shows a flowchart of an approach for handling inconsistent references according to some embodiments of the invention.

If a component were to crash midway in a transaction, the recovery process could re-apply the intent recorded in the intent log. FIG. 11 shows a flowchart of an approach for using the tentative update information in the intent log to check for and address crashes. At 1102, an identification is made of dangling intent information in the intent log. At 1104, a check is made of the status of the status of the operation that corresponds to the tentative update in the intent log. This check is made by sending an inquiry to the extent store.

If the conclusion is reached at 1106 that the operation corresponding to the tentative update has completed, then clean-up can occur at 1108 to remove the dangling intent information. Even if the other operation has not completed the update, it could be the situation that the update is completeable. If so, then part of the clean-up activities at 1108 is to also complete the operation.

However, it is possible that the crash is not recoverable. In this situation, at 1110, recovery will occur to roll back the effects of the crashed operation. Part if the clean up activities at 1110 is to clean up the intent log to remove the references to the tentative updates.

Therefore, what has been described is an improved approach for implementing metadata to perform I/O management for storage devices in a virtualization architecture.

System Architecture

Figure 17:
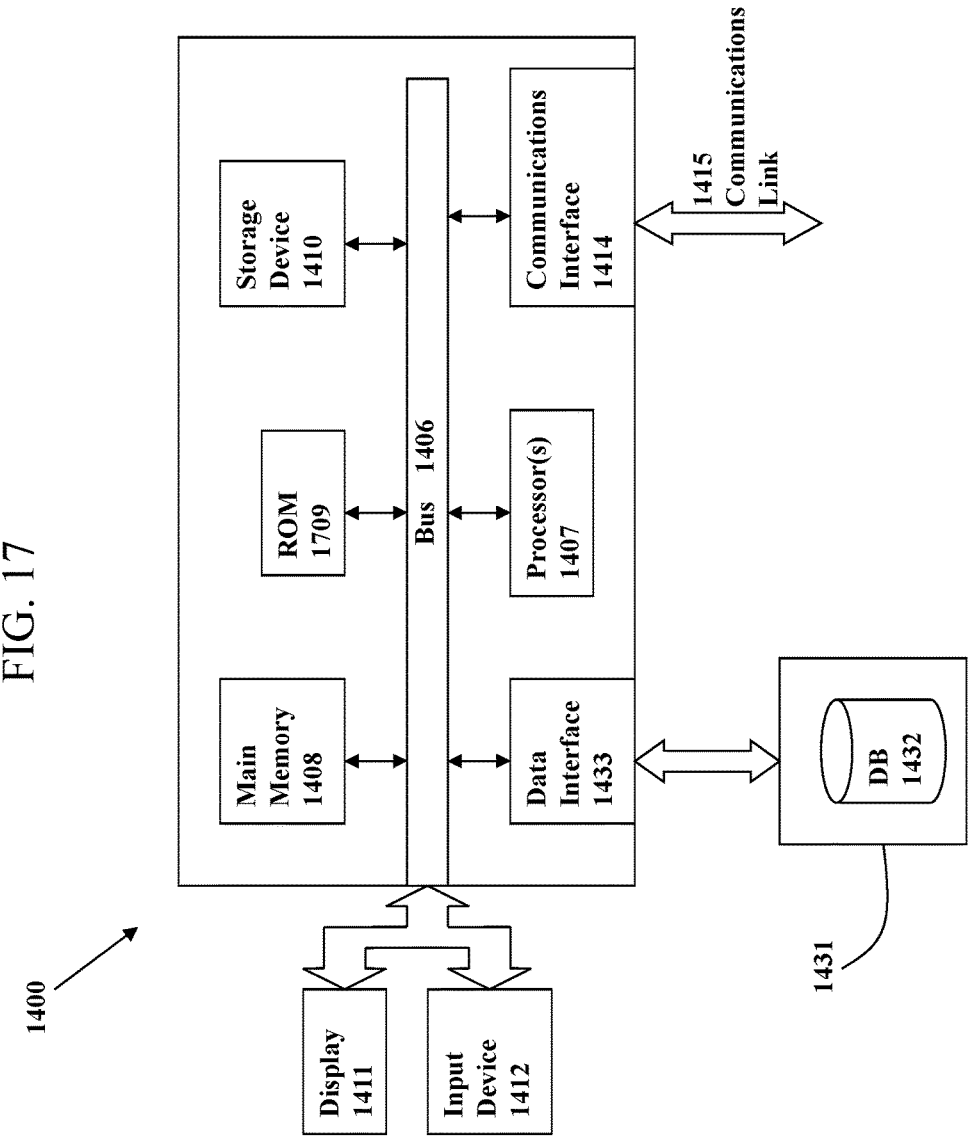
FIG. 17 is a block diagram of a computing system suitable for implementing an embodiment of the present invention.

FIG. 17 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1709 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1709 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a computer readable medium 1432 may be accessed through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for managing metadata in a virtualization system, comprising:
   identifying metadata to track data within storage devices for the virtualization system, the virtualization system comprising a plurality of nodes that includes at least a first node having a first local storage device and a first service virtual machine and a second node having a second local storage device and a second service virtual machine, the first local storage device and the second local storage device forming part of a global storage pool such that any of the first node and the second node can access virtual disks on both the first local storage device and the second local storage device, with the first node and the second node concurrently accessing the metadata through their respective service virtual machines to manage the virtual disks within the global storage pool the virtual disks being virtual structures implemented by the metadata managed by the first and second service virtual machines;
   performing a compare and swap operation to manage an update to the metadata maintained by service virtual machines on each of the plurality of nodes in the virtualization system, the compare and swap operation addressing possible data inconsistencies caused by multiple update operations generated by the plurality of nodes when concurrently updating the metadata for the data in the global storage pool having the first local storage device and the second local storage device that are accessible by both the first node and the second node through their respective service virtual machines, wherein validation information for the metadata is processed by the first or second service virtual machines to perform the update;
   receiving, from a node from among the plurality of nodes, an instruction to perform a read operation;
   before performing the read operation, determining whether the plurality of nodes comprises a downed node;
   if the plurality of nodes comprises the downed node, then incrementing a current consensus instance to a new instance count and choosing a value for a prior instance to be associated with the new instance count; and
   invalidating a write operation for the downed node if the downed node comes back up, wherein the write operation for the downed node is invalidated as a result of a consensus instance corresponding to the write operation being different than the new instance count.

2. The method of claim 1, wherein the validation information comprises a timestamp or a checksum.

3. The method of claim 1, wherein the validation information is obtained for the metadata and is checked prior to completion of the update.

4. The method of claim 1, wherein the compare and swap operation uses a consensus algorithm to manage the update to the metadata maintained on the plurality of nodes.

5. The method of claim 4, in which the consensus algorithm provides for selection of a value by consensus among the plurality of nodes, wherein a consensus instance is incremented to a new value.

6. The method of claim 1, in which an inconsistency is identified when a previously downed node that previously made the update has an instance value different from the value associated with the new instance count.

7. The method of claim 6, in which the update by the previously downed node is invalidated.

8. The method of claim 4, in which a sequence of updates is identified with an epoch value.

9. The method of claim 8, in which the epoch value is used to process a deletion of data.

10. The method of claim 1, in which a race condition is identified and accessing of the metadata is restarted, wherein the race condition is identified because of an inconsistency in the metadata.

11. The method of claim 10, in which a check is made whether the inconsistency is resolved after accessing of the metadata is restarted, wherein an error condition is identified if the inconsistency is not resolved.

12. The method of claim 1 in which an update operation to an item of metadata is performed such that the item of metadata is confirmed not to have been changed by another entity from a start of the update operation to a conclusion of the update operation.

13. The method of claim 1, in which a tabular structure is used to maintain entries for metadata values, and an instance count corresponds to the metadata values in the tabular structure, wherein the instance count is increased for updates to the metadata values.

14. The method of claim 13, in which a consolidated instance count is maintained for multiple entries in the tabular structure, the consolidated instance count corresponding to a collective set of data.

15. The method of claim 14, in which the consolidated instance count comprises a row instance value for a row of entries.

16. The method of claim 15, further comprising:
determining whether the plurality of nodes comprises a downed node and incrementing the consolidated instance count to a new instance count and setting a delete clock if the plurality of nodes comprises the downed node, wherein the delete clock is maintained for the tabular structure; and
invalidating any changes made by the downed node to the tabular structure if the downed node comes back up, wherein a column from the tabular structure associated with a time less than the delete clock is invalidated or deleted.

17. The method of claim 16, wherein incrementing the consolidated instance count further comprises copying contents of an entire row for the new instance.

18. A computer program product embodied on a non-transitory computer readable medium, the non-transitory computer readable medium having stored thereon a sequence of instructions which, when executed by a processor causes the processor to execute a method for managing metadata in a virtualization system, the method comprising:
identifying metadata to track data within storage devices for the virtualization system, the virtualization system comprising a plurality of nodes that includes at least a first node having a first local storage device and a first service virtual machine and a second node having a second local storage device and a second service virtual machine, the first local storage device and the second local storage device forming part of a global storage pool such that any of the first node and the second node can access virtual disks on both the first local storage device and the second local storage device, with the first node and the second node concurrently accessing the metadata through their respective service virtual machines to manage the virtual disks within the global storage pool the virtual disks being virtual structures implemented by the metadata managed by the first and second service virtual machines;
performing a compare and swap operation to manage an update to the metadata maintained by service virtual machines on each of the plurality of nodes in the virtualization system, the compare and swap operation addressing possible data inconsistencies caused by multiple update operations generated by the plurality of nodes when concurrently updating the metadata for the data in the global storage pool having the first local storage device and the second local storage device that are accessible by both the first node and the second node through their respective service virtual machines, wherein validation information for the metadata is processed by the first or second service virtual machines to perform the update;
receiving, from a node from among the plurality of nodes, an instruction to perform a read operation;
before performing the read operation, determining whether the plurality of nodes comprises a downed node;
if the plurality of nodes comprises the downed node, then incrementing a current consensus instance to a new instance count and choosing a value for a prior instance to be associated with the new instance count; and
invalidating a write operation for the downed node if the downed node comes back up, wherein the write operation for the downed node is invalidated as a result of a consensus instance corresponding to the write operation being different than the new instance count.

19. The computer program product of claim 18, wherein the validation information comprises a timestamp or a checksum.

20. The computer program product of claim 18, wherein the validation information is obtained for the metadata and is checked prior to completion of the update.

21. The computer program product of claim 18, wherein the compare and swap operation uses a consensus algorithm to manage the update to the metadata maintained on the plurality of nodes.

22. The computer program product of claim 21, in which the consensus algorithm provides for selection of a value by consensus among the plurality of nodes, wherein a consensus instance is incremented to a new value.

23. The computer program product of claim 18, in which an inconsistency is identified when a previously downed node that previously made the update has an instance value different from the value associated with the new instance count.

24. The computer program product of claim 23, in which the update by the previously downed node is invalidated.

25. The computer program product of claim 21, in which a sequence of updates is identified with an epoch value.

26. The computer program product of claim 25, in which the epoch value is used to process a deletion of data.

27. The computer program product of claim 18, in which a race condition is identified and accessing of the metadata is restarted, wherein the race condition is identified because of an inconsistency in the metadata.

28. The computer program product of claim 27, in which a check is made whether the inconsistency is resolved after accessing of the metadata is restarted, wherein an error condition is identified if the inconsistency is not resolved.

29. The computer program product of claim 18, in which an update operation to an item of metadata is performed such that the item of metadata is confirmed not to have been changed by another entity from a start of the update operation to a conclusion of the update operation.

30. The computer program product of claim 18, in which a tabular structure is used to maintain entries for metadata values, and an instance count corresponds to the metadata values in the tabular structure, wherein the instance count is increased for updates to the metadata values.

31. The computer program product of claim 30, in which a consolidated instance count is maintained for multiple entries in the tabular structure.

32. The computer program product of claim 31, in which the consolidated instance count comprises a row instance value for a row of entries.

33. The computer program product of claim 32, further comprising:
   determining whether the plurality of nodes comprises a downed node and incrementing the consolidated instance count to a new instance count and setting a delete clock if the plurality of nodes comprises the downed node, wherein the delete clock is maintained for the tabular structure; and
   invalidating any changes made by the downed node to the tabular structure if the downed node comes back up, wherein a column from the tabular structure associated with a time less than the delete clock is invalidated or deleted.

34. The computer program product of claim 33, wherein a column associated with a time less than the delete clock is invalidated or deleted.

35. A storage system comprising storage devices in a virtualization system, comprising:
   a processor to handle computing instructions to access the storage devices; and computer readable medium comprising identifying metadata to track data within storage devices for the virtualization system, the virtualization system comprising a plurality of nodes that includes at least a first node having a first local storage device and a first service virtual machine and a second node having a second local storage device and a second service virtual machine, the first local storage device and the second local storage device forming part of a global storage pool such that any of the first node and the second node can access virtual disks on both of the first local storage device and the second local storage device, with the first node and the second node concurrently accessing the metadata through their respective service virtual machines to manage the virtual disks within the global storage pool, the virtual disks being virtual structures implemented by the metadata managed by the first and second service virtual machines,
   where a compare and swap operation is performed to manage an update to the metadata maintained by service virtual machines on each of the plurality of nodes in the virtualization system, the compare and swap operation addressing possible data inconsistencies caused by multiple update operations generated by the plurality of nodes when concurrently updating the metadata for the data in the global storage pool having the first local storage device and the second local storage device that are accessible by both the first node and the second node through their respective service virtual machines, wherein validation information for the metadata is processed by the first or second service virtual machines to perform the update;
   receiving, from a node from among the plurality of nodes, an instruction to perform a read operation;
   before performing the read operation determining whether the plurality of nodes comprises a downed node;
   if the plurality of nodes comprises the downed node, then incrementing a current consensus instance to a new instance count and choosing a value for a prior instance to be associated with the new instance count; and
   invalidating a write operation for the downed node if the downed node comes back up, wherein the write operation for the downed node is invalidated as a result of a consensus instance corresponding to the write operation being different than the new instance count.

36. The system of claim 35, wherein the validation information comprises a timestamp or a checksum.

37. The system of claim 35, wherein the validation information is obtained for the metadata and is checked prior to completion of the update.

38. The system of claim 35, wherein the compare and swap operation uses a consensus algorithm to manage the update to the metadata maintained on the plurality of nodes.

39. The system of claim 38, in which the consensus algorithm provides for selection of a value by consensus among the plurality of nodes, wherein a consensus instance is incremented to a new value.

40. The system of claim 35, in which an inconsistency is identified when a previously downed node that previously made the update has an instance value different from the value associated with the new instance count.

41. The system of claim 40, in which the update by the previously downed node is invalidated.

42. The system of claim 38, in which a sequence of updates corresponds to an epoch value.

43. The system of claim 42, in which the epoch value corresponds to a deletion of data.

44. The system of claim 35, in which identification of a race condition corresponds to restart of the metadata, wherein the race condition is identified because of an inconsistency in the metadata.

45. The system of claim 35, further comprising a tabular structure to maintain entries for metadata values, wherein an instance count corresponds to the metadata values in the tabular structure, and wherein the instance count is increased for updates to the metadata values.

46. The system of claim 45, in which a consolidated instance count is maintained for multiple entries in the tabular structure, the consolidated instance count corresponding to a collective set of data.

47. The system of claim 46, in which the consolidated instance count comprises a row instance value for a row of entries.

48. The system of claim 47, further comprising:
   determining whether the plurality of nodes comprises a downed node and incrementing the consolidated instance count to a new instance count and setting a delete clock if the plurality of nodes comprises the downed node, wherein the delete clock is maintained for the tabular structure; and
   invalidating any changes made by the downed node to the tabular structure if the downed node comes back up, wherein a column from the tabular structure associated with a time less than the delete clock is invalidated or deleted.

49. The system of claim 48, wherein incrementing the consolidated instance count further comprises copying contents of an entire row for the new instance.

* * * * *